US012634847B2

(12) United States Patent
Sharma et al.

(10) Patent No.: US 12,634,847 B2
(45) Date of Patent: May 19, 2026

(54) METHOD AND A SYSTEM FOR DESIGN OF SIGNALING RADIO BEARER AND HANDLING CONTROL PLANE DATA TRANSMISSION AND RECEPTION

(71) Applicant: SAMSUNG ELECTRONICS CO., LTD., Suwon-si (KR)

(72) Inventors: Neha Sharma, Bangalore (IN); Aneesh Deshmukh, Bangalore (IN); Anshuman Nigam, Bangalore (IN); Jinho Choi, Suwon-si (KR); Dongmyoung Kim, Suwon-si (KR); Shiva Souhith Gantha, Bangalore (IN); Vikalp Mandawaria, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 451 days.

(21) Appl. No.: 18/312,970

(22) Filed: May 5, 2023

(65) Prior Publication Data

US 2023/0362848 A1 Nov. 9, 2023

Related U.S. Application Data

(63) Continuation of application No. PCT/KR2023/005905, filed on Apr. 28, 2023.

(30) Foreign Application Priority Data

May 7, 2022 (IN) .............................. 202241026540
Apr. 11, 2023 (IN) .............................. 202241026540

(51) Int. Cl.
*H04W 72/04* (2023.01)
*H04W 56/00* (2009.01)
(Continued)

(52) U.S. Cl.
CPC ..... *H04W 56/001* (2013.01); *H04W 72/1263* (2013.01); *H04W 72/566* (2023.01)

(58) Field of Classification Search
CPC ........... H04W 72/1263; H04W 72/566; H04W 88/14; H04W 80/02; H04L 41/0895; H04L 41/0806
See application file for complete search history.

(56) References Cited

U.S. PATENT DOCUMENTS 11,212,867 B2 12/2021 Kim et al.
2017/0238195 A1 8/2017 Hao et al.
(Continued)

FOREIGN PATENT DOCUMENTS

KR 10-1021278 3/2011
WO 2018/203739 11/2018
(Continued)

OTHER PUBLICATIONS

Na Li, 6G Towards 2030: From Key Technology to Network Architecture, Micro-Service-Based Radio Access Network; Mar. 2022 (Year: 2022).*
(Continued)

*Primary Examiner* — Mahbubul Bar Chowdhury
(74) *Attorney, Agent, or Firm* — NIXON & VANDERHYE P.C.

(57) ABSTRACT

In an embodiment, a method for signaling radio bearer and handling of control plane data transmission and reception for a 6G network architecture is disclosed. The method includes a flexible and simple network function for 6G providing a degree of freedom for network function placement due to cloudification and virtualization of network functions. The method further includes a network architecture for 6G where any network node communicates with any other network node being at RAN or core network function enabling a
(Continued)

300

DEPLOYING A PACKET DATA CONVERGENCE PROTOCOL (PDCP) ENTITY AT ONE OF RADIO ACCESS NETWORK (RAN) MODULES, A PLURALITY OF NETWORK FUNCTION (NF) MODULES, OR AT LEAST ONE NF MODULE FROM THE PLURALITY OF THE NF MODULES; ~302

DETERMINING WHETHER THE PDCP ENTITY INTERACTS WITH EACH OF THE PLURALITY OF NF MODULES, WITH THE RAN MODULE BASED ON THE DEPLOYMENT OF THE PDCP ENTITY; ~304

DETERMINING WHETHER SYNCHRONIZATION IS REQUIRED BETWEEN THE PLURALITY OF THE NF MODULES BASED ON A RESULT OF THE DETERMINATION; AND ~306

TRANSMITTING A MESSAGE TO ONE OF THE RAN MODULES, THE PLURALITY OF NETWORK FUNCTION (NF) MODULES, OR THE AT LEAST ONE OF THE NF MODULE FROM THE PLURALITY OF THE NF MODULES BASED ON A RESULT OF THE DETERMINATION OF REQUIREMENT OF THE SYNCHRONIZATION ~308 single anchor for the UE to exchange control signaling with network. The method further enables this new network architecture for 6G with design of a signaling radio bearer which is required to communicate between network and UE. The method further defined the procedure for handling of control plane message for transmission and reception between UE and network entity.

20 Claims, 27 Drawing Sheets

(51) Int. Cl.
| | | |
|---|---|---|
| *H04W 72/1263* | (2023.01) | |
| *H04W 72/566* | (2023.01) | |

(56) References Cited

U.S. PATENT DOCUMENTS

| | | | |
|---|---|---|---|
| 2019/0335366 A1 | 10/2019 | Jin et al. | |
| 2020/0221539 A1 | 7/2020 | Yang et al. | |
| 2021/0105623 A1 | 4/2021 | Kweon et al. | |
| 2021/0235534 A1 | 7/2021 | Fiorani et al. | |
| 2023/0179640 A1* | 6/2023 | Qiao | H04W 4/24 |
| | | | 709/227 |
| 2023/0362215 A1* | 11/2023 | Kang | H04W 48/18 |
| 2024/0051611 A1 | 2/2024 | An et al. | |
| 2025/0212093 A1* | 6/2025 | Dai | H04W 48/08 |

FOREIGN PATENT DOCUMENTS

| | | |
|---|---|---|
| WO | 2022/032586 | 2/2022 |
| WO | 2022/066069 | 3/2022 |

OTHER PUBLICATIONS

Engin Zeydan, Service Based Virtual RAN Architecture for Next Generation Cellular Systems, Jan. 2022 (Year: 2022).*
Search Report and Written Opinion dated Aug. 4, 2023 issued in International Patent Application No. PCT/KR2023/005905.
Extended European Search Report dated Jan. 31, 2025 issued in European Patent Application No. 23803737.8.
3GPP TS 25.331, "Universal Mobile Telecommunications System (UMTS); Radio Resource Control (RRC); Protocol specification", Version 11.9.0, Release 11, Mar. 2014, 2, 109 pages.
3GPP TR 23.799, 3rd Generation Partnership Project; Technical Specification Group Services and System Aspects; Study on Architecture for Next Generation System, Release 14, Dec. 2016, 522 pages.
Indian Office Action issued Jun. 2, 2025 in corresponding Indian Patent Application No. 202241026540.

* cited by examiner

300

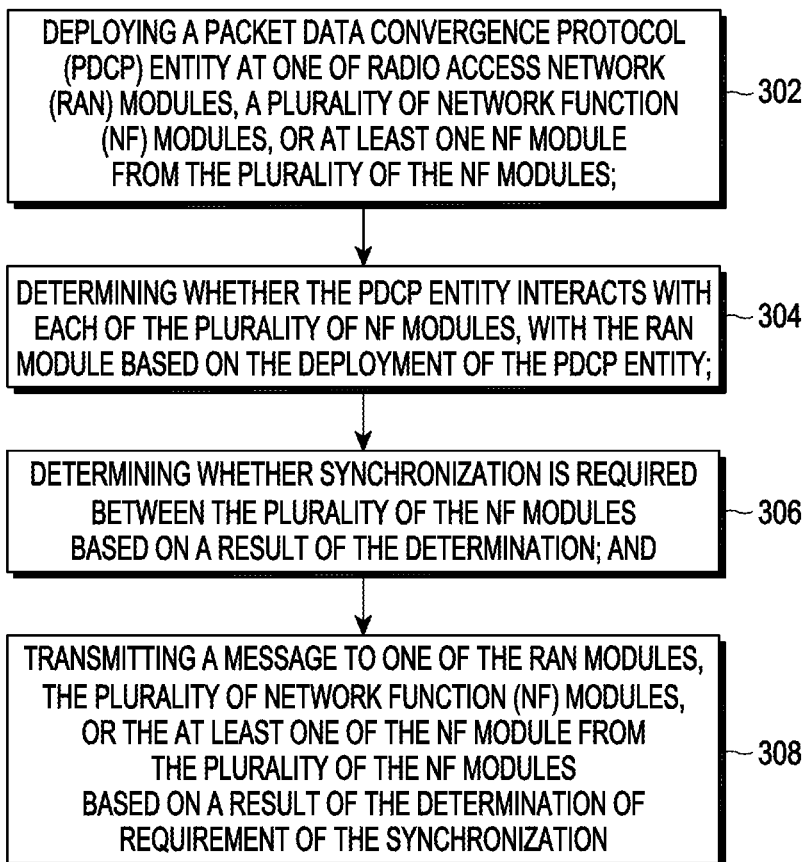

DEPLOYING A PACKET DATA CONVERGENCE PROTOCOL (PDCP) ENTITY AT ONE OF RADIO ACCESS NETWORK (RAN) MODULES, A PLURALITY OF NETWORK FUNCTION (NF) MODULES, OR AT LEAST ONE NF MODULE FROM THE PLURALITY OF THE NF MODULES; ~302

DETERMINING WHETHER THE PDCP ENTITY INTERACTS WITH EACH OF THE PLURALITY OF NF MODULES, WITH THE RAN MODULE BASED ON THE DEPLOYMENT OF THE PDCP ENTITY; ~304

DETERMINING WHETHER SYNCHRONIZATION IS REQUIRED BETWEEN THE PLURALITY OF THE NF MODULES BASED ON A RESULT OF THE DETERMINATION; AND ~306

TRANSMITTING A MESSAGE TO ONE OF THE RAN MODULES, THE PLURALITY OF NETWORK FUNCTION (NF) MODULES, OR THE AT LEAST ONE OF THE NF MODULE FROM THE PLURALITY OF THE NF MODULES BASED ON A RESULT OF THE DETERMINATION OF REQUIREMENT OF THE SYNCHRONIZATION ~308

(OPTION 3)

<u>600</u>

(OPTION 3)

HTTP OVER TCP/SCTP OR F1-AP OR F1-C

700

700

800

802

800

900

802

900

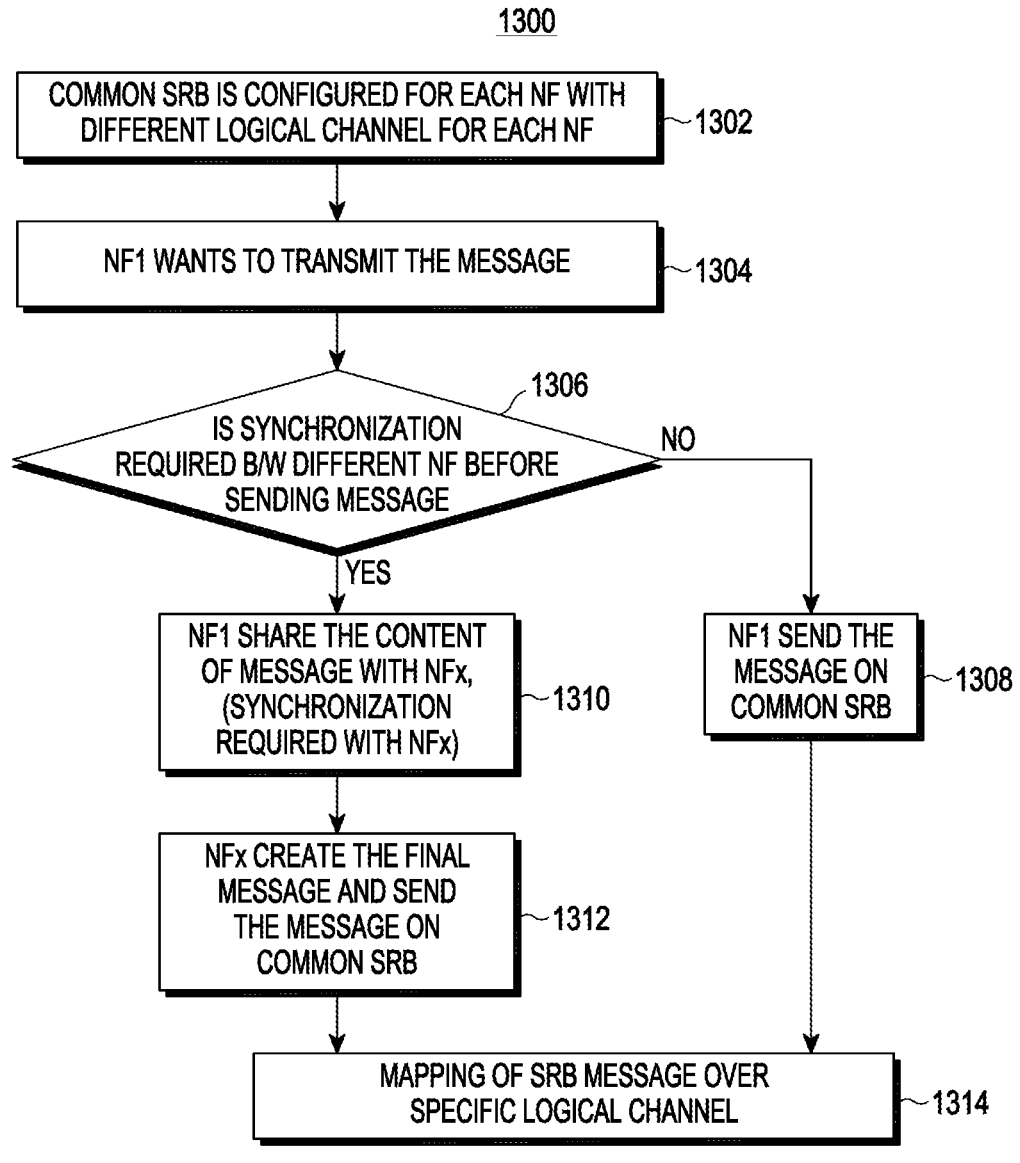

1300

COMMON SRB IS CONFIGURED FOR EACH NF WITH DIFFERENT LOGICAL CHANNEL FOR EACH NF ~1302

NF1 WANTS TO TRANSMIT THE MESSAGE ~1304

IS SYNCHRONIZATION REQUIRED B/W DIFFERENT NF BEFORE SENDING MESSAGE 1306

NO

YES

NF1 SHARE THE CONTENT OF MESSAGE WITH NFx, (SYNCHRONIZATION REQUIRED WITH NFx) ~1310

NF1 SEND THE MESSAGE ON COMMON SRB ~1308

NFx CREATE THE FINAL MESSAGE AND SEND THE MESSAGE ON COMMON SRB ~1312

MAPPING OF SRB MESSAGE OVER SPECIFIC LOGICAL CHANNEL ~1314

PDCP ENTITY IN CMD

1400b

PDCP ENTITY IN NF

1600

COMMON SRBS IS CONFIGURED FOR EACH NF    ~1602

UE SEND MESSAGE ON CONFIGURED SRB    ~1604

CONTROL ENTITY OR DU WILL MAINTAIN THE MAPPING OF MESSAGE AND CORRESPONDING NF. CONTROL ENTITY CAN HAVE FUNCTIONALITY WHICH CAN DETERMINE TYPE OF MESSAGE    ~1606

SEND THE MESSAGE TO SPECIFIC NF    ~1608

1700a

PDCP ENTITY IN CONTROL

1700b

PDCP ENTITY IN NF

1900

COMMON SRBS IS CONFIGURED FOR PARTICULAR NF ~1902

UE SEND MESSAGE ON CONFIGURED SRB ~1904

SEND THE MESSAGE TO SPECIFIC NF ~1906

NF BASED ON TYPE OF MESSAGE WILL FORWARD
THAT MESSAGE TO OTHER NF ENTITY ~1908

2000a

PDCP ENTITY IN SWITCH

2000b

PDCP ENTITY IN NF

2300a

PDCP ENTITY IN SWITCH

2300b

PDCP ENTITY IN NF

2400

DIFFERENT SRBS ARE CONFIGURED FOR EACH NF   ~2402

NF1 WANTS TO TRANSMIT THE MESSAGE   ~2404

2406
IS SYNCHRONIZATION REQUIRED B/W DIFFERENT NF BEFORE SENDING MESSAGE

YES

NO

2410
NF1 SHARE THE CONTENT OF MESSAGE WITH NFn, (SYNCHRONIZATION REQUIRED WITH NFn)

2408
NF1 SEND THE MESSAGE SRB WHICH IS SUPPORTED BY NF1

2412
NFn CREATE THE FINAL MESSAGE AND SEND ON SRB WHICH IS SUPPORTED BY NFn

2500

2600

COMMON SRBS IS CONFIGURED FOR EACH NF WITH DIFFERENT LOGICAL CHANNEL FOR EACH NF ~2602

UE MAINTAINS LC AND NF MAPPING AS CONFIGURED BY NW ~2604

UE SENDS MESSAGE ON LC SPECIFIC FOR NF ~2606

CONTROL ENTITY OR DU IDENTIFY THE NF BASED ON LC ~2608

UE SENDS MESSAGE TO NF ~2610

2700

2800

1

METHOD AND A SYSTEM FOR DESIGN OF SIGNALING RADIO BEARER AND HANDLING CONTROL PLANE DATA TRANSMISSION AND RECEPTION

CROSS-REFERENCE TO RELATED APPLICATIONS

This application is a continuation of International Application No. PCT/KR2023/005905 designating the United States, filed on Apr. 28, 2023, in the Korean Intellectual Property Receiving Office and claiming priority to Indian Provisional Patent Application No. 202241026540, filed on May 7, 2022, in the Indian Patent Office, and to Indian Complete Patent Application No. 202241026540, filed on Apr. 11, 2023, in the Indian Patent Office, the disclosures of all of which are incorporated by reference herein in their entireties.

BACKGROUND

Field

The disclosure relates to the field of wireless communication. For example, the disclosure relates to a design of signaling radio bearer and handling of a control plane data transmission and reception for a 6G network architecture.

Description of Related Art

In recent years, several broadband wireless technologies have been developed to meet the growing number of broadband subscribers by providing better applications and services. A second generation (2G) wireless communication system has been developed to provide voice services while ensuring the mobility of users. Third-generation wireless communication system supports not only voice service but also supports data service. In recent years, a fourth-generation wireless communication system has been developed to provide high-speed data service. However, currently, the fourth-generation (4G) wireless communication system suffers from a lack of resources to meet the growing demand for high-speed data services. This problem is addressed by the deployment of a fifth-generation wireless communication system to meet the ever-growing demand for high-speed data services. Furthermore, the fifth-generation (5G) wireless communication system provides ultra-reliability and supports low-latency applications.

A 5G system architecture is based on Service-Based Architecture (SBA). As per TS 23.501 the 5G system architecture is defined as service-based and the interaction between network functions is represented in the following two ways.

1. A service-based representation, where network functions (e.g., AMF) within the control plane enable other authorized network functions to access their services. This representation also includes point-to-point reference points wherever necessary.
2. A reference point representation shows the interaction exists between the NF services in the network functions described by a point-to-point reference point (e. g. N11) between any two network functions (e.g. AMF and SMF).

FIG. 1 is a diagram illustrating a 5G service-based core network architecture 100 depicting usage of service-based interfaces within a control plane (CP), as per the prior art solution. Referring to FIG. 1, considering the conventional methods and systems, the 5G service-based core network architecture brings more scalability and flexibility as any network function (NF) node may interact with any other node in the 5G service-based system architecture. The 5G service-based system architecture shall leverage service-based interactions between CP (control plane) network functions. In this case a set of NFs providing services to other authorized NFs to access their services through an SBI (service based interface). An NF service is one type of capability exposed by an NF (NF service producer) to other authorized NF (NF service consumer) through the service-based interface. The NF service may support one or more NF service operation(s). The network functions may offer different functionalities and thus different NF services. Each of the NF services offered by the network function shall be self-contained, acted upon, and managed independently from the other NF services offered by the same network function (e.g. for scaling).

A service-based interface represents how the set of services is provided or exposed by a given NF. This is the interface where the NF service operations are invoked. The following control plane interfaces within the 5G service-based system architecture are specified in 3GPP TS 23.501 are defined as service-based interfaces: —Namf, Nsmf, Nudm, Nnrf, Nnssf, Nausf, Nnef, Nsmsf, Nudr, Npcf, N5g-eir, Nlmf. The 5G System architecture includes the following network functions (NF) —

Authentication Server Function (AUSF).
Access and Mobility Management Function (AMF).
Data Network (DN), e.g., operator services, Internet access, or 3rd party services.
Unstructured Data Storage Function (UDSF).
Network Exposure Function (NEF).
Network Repository Function (NRF).
Network Slice Specific Authentication and Authorization Function (NSSAAF).
Network Slice Selection Function (NSSF).
Policy Control Function (PCF).
Session Management Function (SMF).
Unified Data Management (UDM).
Unified Data Repository (UDR).
User Plane Function (UPF).
UE radio Capability Management Function (UCMF).
Application Function (AF).
User Equipment (UE).
(Radio) Access Network ((R)AN).
5G-Equipment Identity Register (5G-EIR).
Network Data Analytics Function (NWDAF).
Charging Function (CHF).

The 5G service-based system architecture is based on the service-based interface but the RAN 106 to a CN (core network) is still point to point interaction. Due to network function virtualization, the RAN 106 as we all as the core network 104 may be at the same location but still the RAN 106 may only interact with a single core network function entity e.g., AMF 102. The RAN 106 as well as the AMF 102 becomes an anchor for all UE 108 control messages, and each message has to pass through these network entities which is inefficient as it impacts overall control plane latency. This also leads to an increased number of hops and eventually increases the control plane latency. Therefore, leads to increase overhead at network nodes and control procedure completion time due to the involvement of multiple nodes. This point-to-point communication also leads to redundant functionalities in the RAN 106 and the core network 104 and uses the complex protocols like NGAP (NG application protocol) to communicate between any two nodes.

Thus, there is a need to design a more flexible and simple network architecture that can overcome the various afore-said issues.

SUMMARY

According to an example embodiment, a method for handling the control plane data transmission in a 6G network is provided. The method includes deploying a packet data convergence protocol (PDCP) entity at one of radio access network (RAN) modules, a plurality of network function (NF) modules, or at least one NF module from the plurality of the NF modules. The method further includes determining whether the PDCP entity interacts with each of the plurality of NF modules, with the RAN module based on the deploy-ment of the PDCP entity. The method further includes determining whether synchronization is required between the plurality of the NF modules based on a result of the determination. The method further includes transmitting a message to one of the RAN modules, the plurality of network function (NF) modules, or the at least one of the NF modules from the plurality of the NF modules based on a result of the determination of the requirement of the syn-chronization.

According to an example embodiment, a system for handling the control plane data transmission in a 6G network is provided. The system includes one or more processors configured to deploy a packet data convergence protocol (PDCP) entity at one of radio access network (RAN) mod-ules, a plurality of network function (NF) modules, or at least one NF module from the plurality of the NF modules. The system is further configured to determine whether the PDCP entity interacts with each of the plurality of NF modules, with the RAN module based on the deployment of the PDCP entity. The system is further configured to deter-mine whether synchronization is required between the plu-rality of the NF modules based on a result of the determi-nation. The system is further configured to transmit a message to one of the RAN modules, the plurality of network function (NF) modules, or the at least one of the NF module from the plurality of the NF modules based on a result of the determination of requirement of the synchro-nization.

According to various example embodiments, the disclo-sure discloses a more flexible and simple network architec-ture, a 6G architecture, which may provide a degree of freedom for network function placement due to the cloudi-fication and virtualization of network functions. In the 6G network architecture, any network function module may communicate with any other network function module being at a RAN module or at a control plane network function module. This will also enable a single anchor for the UE to exchange control signaling with the control plane network function modules.

To further illustrate example advantages and features of the disclosure, a more detailed description will be rendered by reference to various example embodiments thereof, which are illustrated in the appended drawings. It is appre-ciated that these drawings depict example embodiments of the disclosure and are therefore not to be considered limiting its scope. The disclosure will be described and explained with additional specificity and detail with reference to the accompanying drawings.

BRIEF DESCRIPTION OF THE DRAWINGS

The above and other aspects, features, and advantages of certain embodiments of the disclosure will be more apparent from the following detailed description, taken in conjunction with the accompanying drawings in which like reference numerals refer to like elements, in which:

FIG. 3 is a flowchart illustrating an example method for handling a control plane data transmission in a 6G Network, according to various embodiments;

FIG. 13 is a flowchart illustrating example handling of transmission operation between UE and Network, according to various embodiments;

Figure 1:
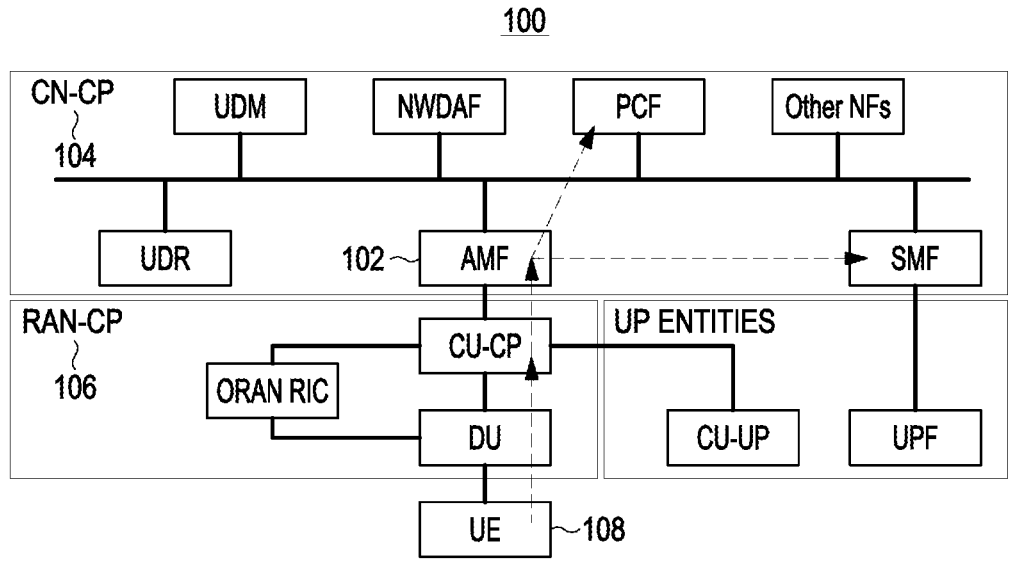
FIG. 1 is a diagram illustrating a 5G system architecture diagram depicting usage of service-based interfaces within control plane (CP), in accordance with the prior art.

Further, those of ordinary skill in the art will appreciate that elements in the drawings are illustrated for simplicity and may not have necessarily been drawn to scale. For example, the flowcharts illustrate the method to help to improve understanding of aspects of the present disclosure. Furthermore, in terms of the construction of the device, one or more components of the device may have been represented in the drawings by conventional symbols, and the drawings may show various details for understanding the various example embodiments of the present disclosure so as not to obscure the drawings with details that may be readily apparent to those of ordinary skill in the art having the benefit of the description herein.

DETAILED DESCRIPTION

It should be understood at the outset that although example implementations of various example embodiments of the present disclosure are illustrated below, the present disclosure may be implemented using any number of techniques, whether currently known or in existence. The present disclosure should in no way be limited to the illustrative implementations, drawings, and techniques illustrated below, including the example design and implementation illustrated and described herein, but may be modified within the scope of the disclosure, including the appended claims along with their full scope of equivalents.

The term "some" as used herein may refer to "none, or one, or more than one, or all." Accordingly, the terms "none," "one," "more than one," "more than one, but not all" or "all" would all may refer to "some." The term "some embodiments" may refer to no embodiments or to one embodiment or to several embodiments or to all embodiments. Accordingly, the term "some embodiments" may refer to "no embodiment, or one embodiment, or more than one embodiment, or all embodiments."

The terminology and structure employed herein are for describing, teaching, and illuminating various embodiments and their specific features and elements and do not limit, restrict, or reduce the spirit and scope of the claims or their equivalents.

For example, any terms used herein such as but not limited to "includes," "comprises," "has," "consists," and grammatical variants thereof do not specify an exact limitation or restriction and certainly do not exclude the possible addition of one or more features or elements, unless otherwise stated, and furthermore must not be taken to exclude the possible removal of one or more of the listed features and elements, unless otherwise stated with the limiting language "MUST comprise" or "NEEDS TO include."

Whether or not a certain feature or element is limited to being used only once, either way, it may still be referred to as "one or more features" or "one or more elements" or "at least one feature" or "at least one element." Furthermore, the use of the terms "one or more" or "at least one" feature or element does not preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having ordinary skill in the art.

Embodiments of the disclosure will be described below in greater detail with reference to the accompanying drawings.

Figure 2:
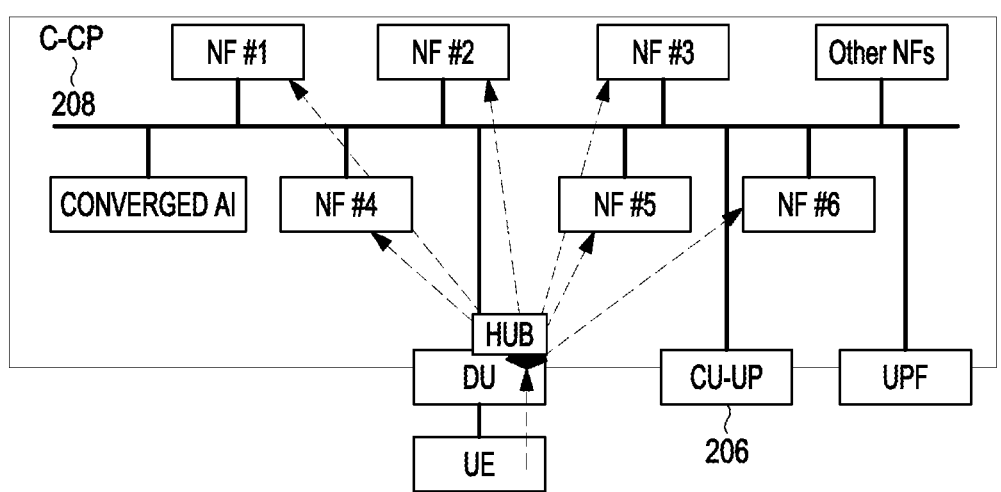
FIG. 2 is a diagram illustrating an example 6G network architecture, according to various embodiments.

FIG. 2 is a diagram 200 illustrating a 6G network architecture, according to various embodiments. In FIG. 2, in the 6G architecture, a RAN module and a Network or a control plane network function module interact with each other through a common control interface. The RAN module may include a HUB module, a DU module, a switch, a CMD, a UE (user equipment), etc. However, the network or the control plane network function module 208 may include different network function (NF) modules. Like for example, the different NF modules may include but not limited to $NF_1$, $NF_2$, $NF_3$ . . . $NF_n$, other NFs, converged AI, etc. In other words, up to the HUB module, it is all the RAN module, and beyond that, all are the control plane network function modules. In an embodiment, the different NF modules may belong to different services like connection management, session management, handovers, service request, etc. In an embodiment, the terms "RAN module" and "RAN" have been used interchangeably throughout the disclosure, including the drawings.

In the 6G network architecture as shown in FIG. 2, the RAN is acting as a service-based RAN. As a result, the RAN may interact with any of the NF modules present in the network or the control plane network function modules. All the different NF modules may be controlled by the Hub module or the switch, or the CMD. In that case, the Hub module or the switch, or the CMD becomes a single anchor point for all the UE control messages that are coming from the UE. The Hub module may be an independent module or may be located at a specific NF or may be located along with the DU module or may be kept at the different NF modules. All the control message transmissions between the UE and the HUB module are managed through a single layer. For example, in case the UE wants to transmit a control message to the $NF_1$ module of the network. Then, in that case, the UE's control message is first parsed at the HUB module, and then further the HUB module delivers the UE control message directly to the $NF_1$ module. In an embodiment, an SBI (service based interface) is between the HUB module and the NF modules. The SBI interface may use HTTP/2 types or equivalent protocols for establishing connectivity between the HUB module and the NF modules. In an embodiment, the terms "Network" and control plane network function modules" and "NF module" and "NF" have been used interchangeably throughout the disclosure, including the drawings. In an embodiment, the terms "Network" and control plane network function modules" and "NF module" and "NF" have been used interchangeably throughout the disclosure, including the drawings.

In an embodiment, the disclosure discloses that the 6G architecture may enable end-to-end based architecture to the service-based architecture to make the 6G architecture more efficient, flexible, and simple. To make the 6G architecture more efficient, flexible, and simple, the 6G architecture and procedure are redesigned by:

Designing a split network function between the RAN and the core network function module.

Design of signaling radio bearer (SRB) for interaction between the RAN module and the NF modules.

In an embodiment, the design of the split network function between the RAN and the core network function module may be obtained by:

Defining deployment of a PDCP entity.

Defining of interaction between the different NF modules.

Handling of generation of messages based on the deployment of the PDCP entity and the interaction between the various modules, for example, the RAN module, the DU module, the HUB module, and the NF modules.

In an embodiment, the design of signalling radio bearer (SRB) for interaction between the RAN module and the NF modules may be obtained by:

Design of SRB based on the deployment of the PDCP entity and the interaction between the different NF modules.

Handling of the control plane data Transmit operation b/w the UE and the NW.

Handling of the control plane data Receive operation b/w the UE and the NW.

In an embodiment, the design of the split network function between the RAN and the core network function module is disclosed. For the design of the split network function between the RAN and the control plane network function module, there is a need to define the placement of the packet data convergence protocol (PDCP) entity. The PDCP entity for the control plane network function module is used for the transfer and reception of the control plane data. The control plane data is transmitted or received over a signalling radio bearer (SRB) which is terminating at the PDCP entity. In the current 6G architecture, the PDCP is getting terminated at a central Unit which is at the RAN, and is interacting with an RRC for the control plane data as it is a common anchor point. However, in a proposed 6G architecture, the UE may interact with any of the NF modules. For interaction, there is a need to define the placement of the PDCP entity that may handle the control plane procedure and corresponding procedures need to be defined that may handle sending and receiving a message to the UE. Further, as any of the NF modules may directly send or receive a message, there is a need to define options for interaction b/w the RAN modules and the NF modules which depends on the deployment of the PDCP entity either independently or at a particular NF module.

A detailed explanation of the design of the split network function between the RAN and the core network function module and the design of the signalling radio bearer (SRB)

for interaction between the RAN module and the NF modules will be explained in greater detail below.

FIG. 3 is a flowchart 300 illustrating an example method for handling the control plane data transmission in the 6G Network, according to various embodiments. In FIG. 3, at 302, the packet data convergence protocol (PDCP) entity/module is deployed either on the radio access network (RAN) module, or the PDCP entity may be deployed on a different network function ($NF_n$) modules or the PDCP entity may be deployed at any one of NF modules present in the 6G architecture. At 304, the method determines whether the PDCP entity interacts with each of the different NF modules, or with the RAN module. The determination is done based on the deployment of the PDCP entity on the RAN module or on the different NF modules. In an embodiment, the interaction between the RAN modules and the different NF modules will be described in forthcoming paragraphs.

At 306, the method determines whether synchronization is required between the different NF modules. At 308, a message is transmitted to the RAN module or to the different NF modules, or to a single NF module based on the result of the determination of the requirement of the synchronization. A detailed explanation regarding the deployment of the PDCP entity, the interaction between the RAN modules and the NF modules, and the transmission of the message will be provided in the forthcoming paragraphs.

In an embodiment, the design of the split option between the RAN module and the control network function modules is disclosed. In designing, first, the deployment of the PDCP entity on the RAN module or the control network function modules is decided. Thereafter, the interaction between the different $NF_n$ modules and the RAN module is decided. Thereafter, the handling of the generation of the messages based on the deployment of the PDCP entity and the interaction between the different NF modules and the RAN modules is achieved.

Referring to FIG. 3, where at 302, it is determined that the deployment of the PDCP entity is on the RAN module, or on the different NF modules. In an embodiment, the RAN module may include the HUB module, the DU module, the switch, and the CMD. After determining that the deployment of the PDCP entity is either on the RAN module or on the different $NF_n$ modules, at 304 it is determined whether PDCP entity interacts with each of the different $NF_n$ modules or with the RAN module. So, both, the determination that the deployment of the PDCP entity is on the RAN module or on the different $NF_n$ modules, and the determination of whether the PDCP entity interacts with each of the different $NF_n$ modules or with the RAN module will be discussed with the help of FIG. 4-9 in the forthcoming paragraphs.

Figure 4A:
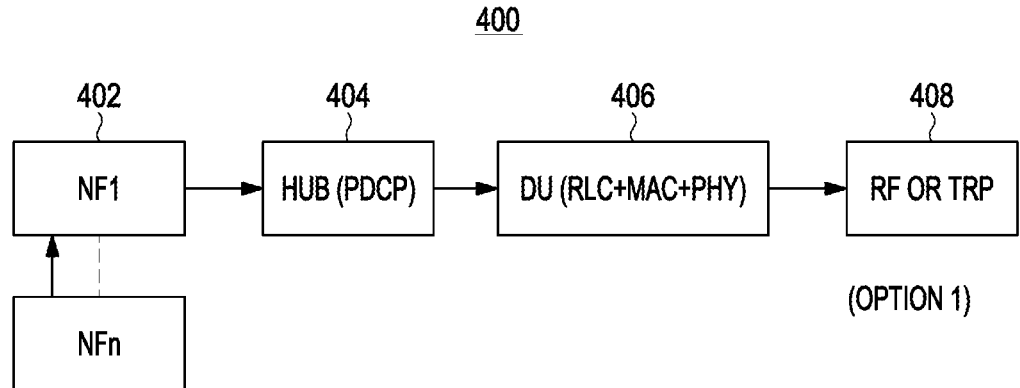
FIGS. 4A and 4B are diagrams illustrating an example PDCP entity deployed on a HUB module that may interact with one NF module, according to various embodiments.
Figure 4B:
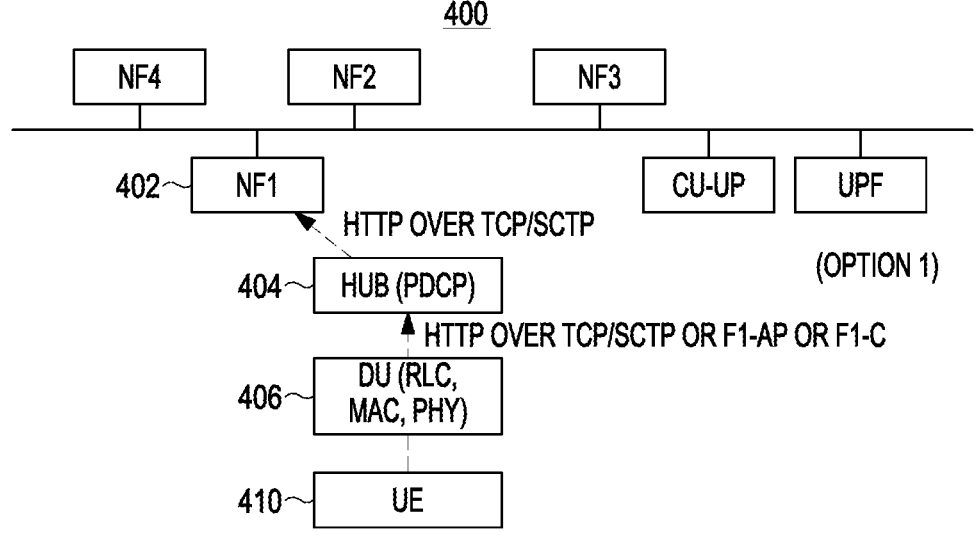

FIGS. 4A and 4B are diagrams 400 illustrating an example PDCP entity deployed on the HUB module 404 and may interact with one NF module, according to various embodiments. In FIGS. 4A and 4B, the PDCP entity is a separate module and is deployed on the HUB module 404. A radio link control (RLC), medium access control (MAC), physical layer, and radiofrequency (RF) are present in the DU (distributed unit) 406. Radio frequency (RF) and transceiver point (TRP) may be separate unit 408.

After the deployment, according to the disclosed design, the PDCP entity may interact with only one of the NF modules among the different $NF_n$ modules as shown in FIGS. 4A and 4B. For example, one of the NF modules may be but not limited to $NF_1$ 402 may interact with the HUB module 404. The HUB module 404 may interact with only one of the NF modules through a service based interface that may run over HTTP over TCP/SCTP interface. In an embodiment, the HUB module 404 may also be part of the DU module 406 itself where all modules like the PDCP, RLC, MAC, and PHY may be placed together. In an embodiment, if the HUB module 404 and the switch are separate then they may interact with each other through F1-AP or point to point interface, or service based interface. Rest all of the $NF_n$ modules may interact with $NF_1$ that may be used to send and receive a message.

In an embodiment, service data adaptation protocol (SDAP) may be part of the DU module 406 or associated with a module that is handling a control unit user plane (CU-UP). Any new data layer module may be part of the DU module 406 or any other equivalent module, and handling of control messages say the PDCP entity or anything equivalent is part of the HUB module 404. In, case any other NF module wants to send the message to the HUB module 404 then, in that case, the message has to be parsed through the $NF_1$ 402 only.

In an example implementation, consider an example, where the PDCP entity is on the HUB module 404 and the PDCP entity may interact with only the $NF_1$ 402 among the different $NF_n$ modules of the Network or the control plane network function modules. For example, the different $NF_n$ modules present in the Network may be $NF_2$, $NF_3$, $NF_4$ . . . till $NF_n$. Interaction of the HUB module 404 with the $NF_1$ 402 is achieved through the service based interface that may run over the HTTP over TCP/SCTP interface. The HUB module 404 needs to be enabled with the PDCP entity and shall support all defined functionality.

Figure 5A:
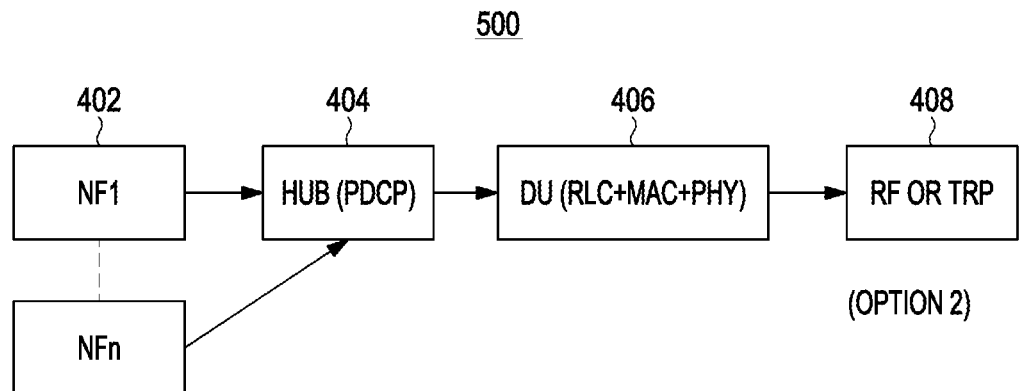
FIGS. 5A and 5B are diagrams illustrating an example PDCP entity deployed on a HUB module that may interact with all different NFn modules, according to various embodiments.
Figure 5B:
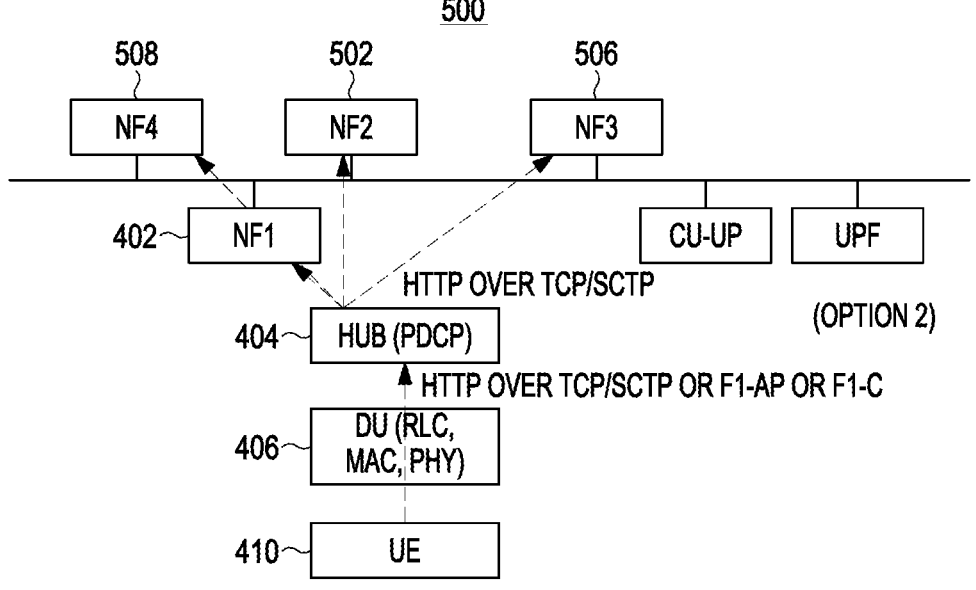

FIGS. 5A and 5B are diagrams 500 illustrating an example PDCP entity deployed on the HUB module 404 and may interact with all different $NF_n$ modules, according to various embodiments. In FIGS. 5A and 5B, the PDCP entity is deployed on the HUB module 404. The PDCP entity is a separate entity and is deployed on the HUB module 404. The RLC, MAC, physical layer, and radio frequency (RF) are in the DU module 406. In an embodiment, the RF and transmission/reception point (TRP) may be separate units 408.

After the deployment, according to the disclosed design, the PDCP entity may interact with all of the different $NF_n$ modules of the Network or the control plane network function modules, like, for example, but not limited to $NF_1$ 402, $NF_2$ 502, $NF_3$ 506, and $NF_4$ 508 as shown in FIGS. 5A and 5B. In an example scenario, consider that the PDCP entity is deployed on the HUB module 404. Thereafter, the PDCP entity may interact with the $NF_1$ 402, $NF_2$ 502, $NF_3$ 506, and $NF_4$ 508 of the Network or the control plane network function modules. Now, consider an example where, the UE 410 wants to send messages for each of the different $NF_n$ modules e.g., the $NF_1$ 402, $NF_2$ 502, $NF_3$ 506, and $NF_4$ 508, then in that case the UE 410 messages are first sent to the DU module 406, and then are further sent to the HUB module 404. Sending of the message may be achieved by interfaces, like the F1-C interface or F1-U type, or SBI interface, between the HUB module 404 and the DU module 406. The HUB module 404 needs to be enabled with the PDCP entity and shall support all defined functionality. Thereafter, the UE 410 messages are sent from the HUB module 404 to the $NF_1$ 402, $NF_2$ 502, $NF_3$ 506, and $NF_4$ 508. In an embodiment, the service data adaptation protocol (SDAP) may be part of the DU module 406 or associated with a module that is handling the CU-UP.

Figure 6A:
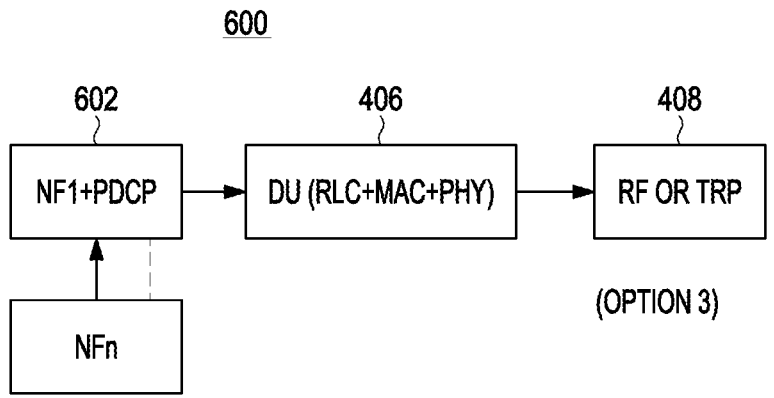
FIGS. 6A and 6B are diagrams illustrating an example PDCP entity deployed on a single NF module that may interact with DU, according to various embodiments.
Figure 6B:
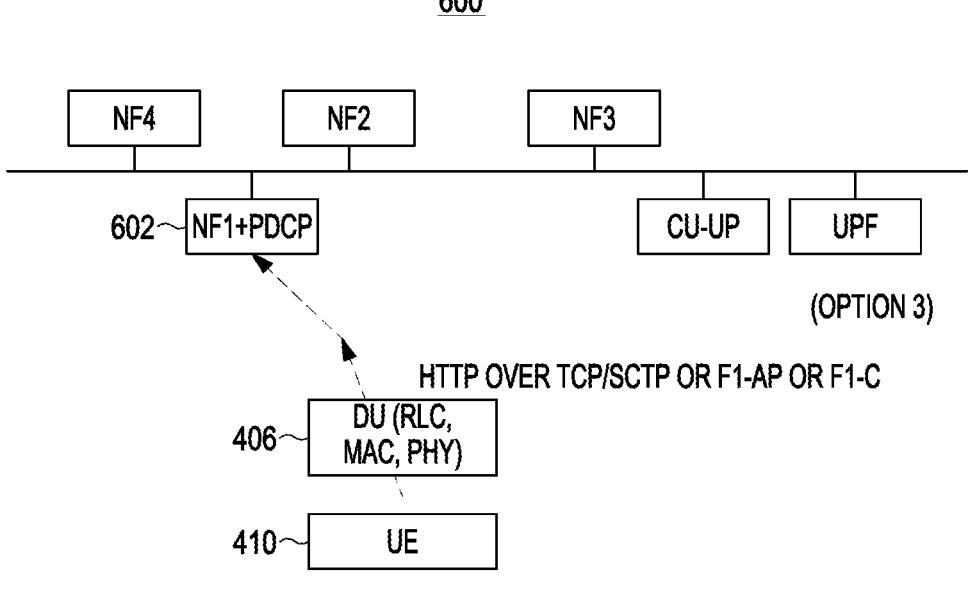

FIGS. 6A and 6B are diagrams 600 illustrating an example PDCP entity deployed on a single NF module and may interact with the DU module 406, according to various embodiments. In FIGS. 6A and 6B, the PDCP entity is deployed on the single NF module. In a non-limiting example, consider that the PDCP entity is deployed only on a single $NF_1$ module 602 of the Network or the control plane network function modules. The RLC, MAC, physical layer, and the RF are in the DU module 406. In an embodiment, the RF and the TRP may be separate units 408.

After the deployment, according to the disclosed design, the PDCP entity may interact with the DU module 406 as shown in FIGS. 6a and 6b. In case all the different $NF_n$ modules or some of NF modules from the different $NF_n$ modules want to transmit a message, they may directly transmit the message to the DU module 406, or to the UE 410, through the $NF_1$ module 602 (where the PDCP entity is placed). In this case, the $NF_1$ 602 may be maintaining the context of all other different $NF_n$ modules. In an embodiment, transmitting the message between the $NF_1$ 602 and the DU module 406 is achieved by the F1-C interface or the F1-U type, or the SBI interface. The $NF_1$ 602 needs to be enabled with PDCP functionality and supports all defined functionality.

In an example implementation, consider a case where the UE 410 wants to transmit a message to any of the different $NF_n$ modules, then in that case the UE 410 may directly transmit the message to the DU module 406 through the $NF_1$ module 602 only. In an embodiment, the SDAP may be part of the DU module 406 or associated with a module that is handling CU-UP.

Figure 7A:
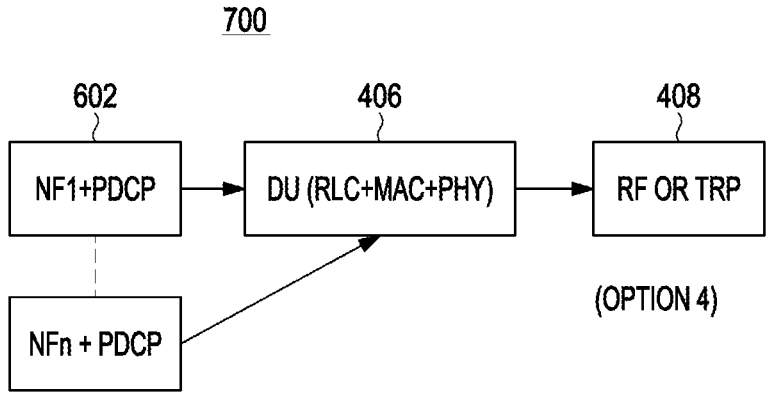
FIGS. 7A and 7B are diagrams illustrating an example PDCP entity is a part of different NF modules of the Network or the control network function modules that may interact with DU, according to various embodiments.
Figure 7B:
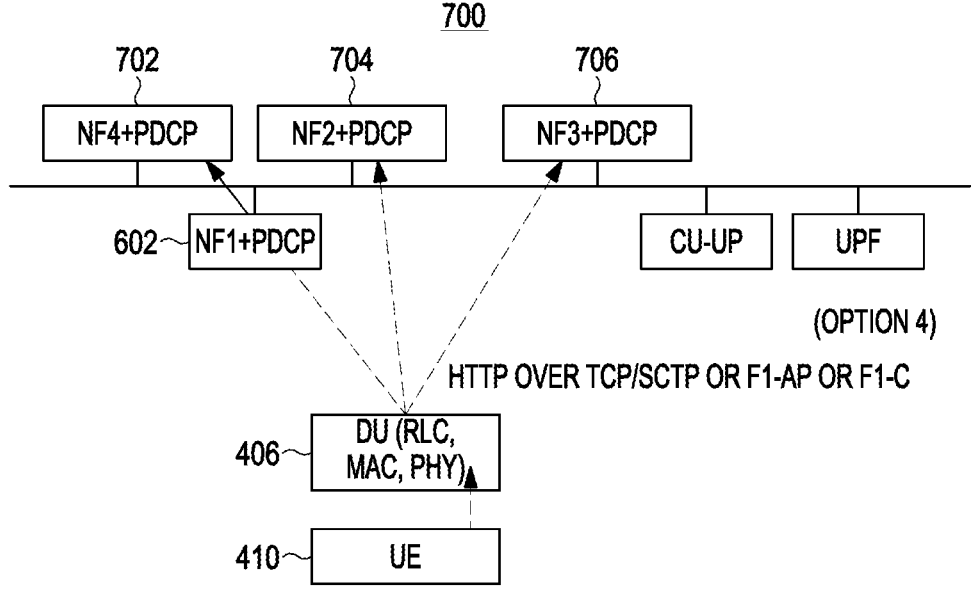

FIGS. 7A and 7B are diagrams 700 illustrating an example PDCP entity as a part of different $NF_n$ modules of the Network or the control network function modules and may interact with the DU module 406, according to various embodiments. In FIGS. 7A and 7B, the PDCP entity is part of the different $NF_n$ modules. In other words, the PDCP entity may be deployed on each of NF modules of the different $NF_n$ modules. For example, the PDCP entity may be deployed on the $NF_1$ 602, $NF_2$ 704, $NF_3$ 706, and $NF_4$ 702. In an embodiment, the RLC, MAC, physical layer, and RF are in the DU module 406. The RF and the TRP may be separate units 408.

After the deployment of the PDCP entity, according to the disclosed design of the disclosure, the PDCP entity may interact with the DU module 406 as shown in FIGS. 7A and 7B. So, in this case, all the different $NF_n$ modules may directly interact with the DU module 406. Considering an example, where all the different $NF_n$ modules (when each of the NF modules has a PDCP module) want to transmit messages to the DU module 406 or to the UE 410. All the different $NF_n$ modules in that case may directly transmit the message to the DU module 406. In an embodiment, transmitting the messages between all the different $NF_n$ modules and the DU module 406 is achieved through the F1-C interface or the F1-U type, or the SBI interface. These interfaces are present between all the different $NF_n$ modules and the DU module 406. In an embodiment, the SDAP may be part of the DU module 406 or associated with a module that is handling the CU-UP.

Figure 8A:
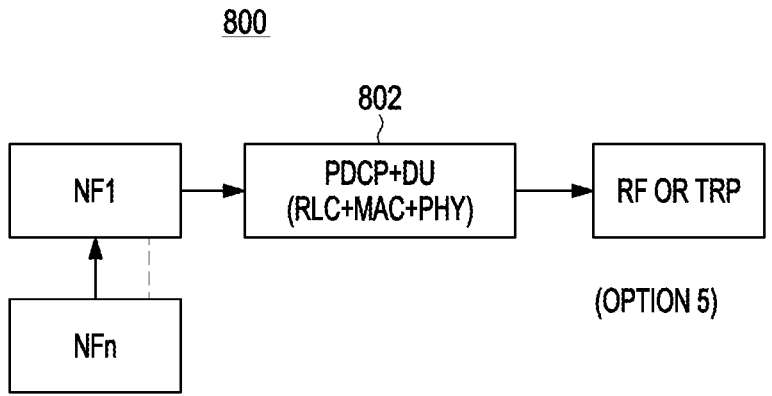
FIGS. 8A and 8B are diagrams illustrating that an example PDCP entity is a part of DU module and that may interact with one NF module, according to various embodi-ments.
Figure 8B:
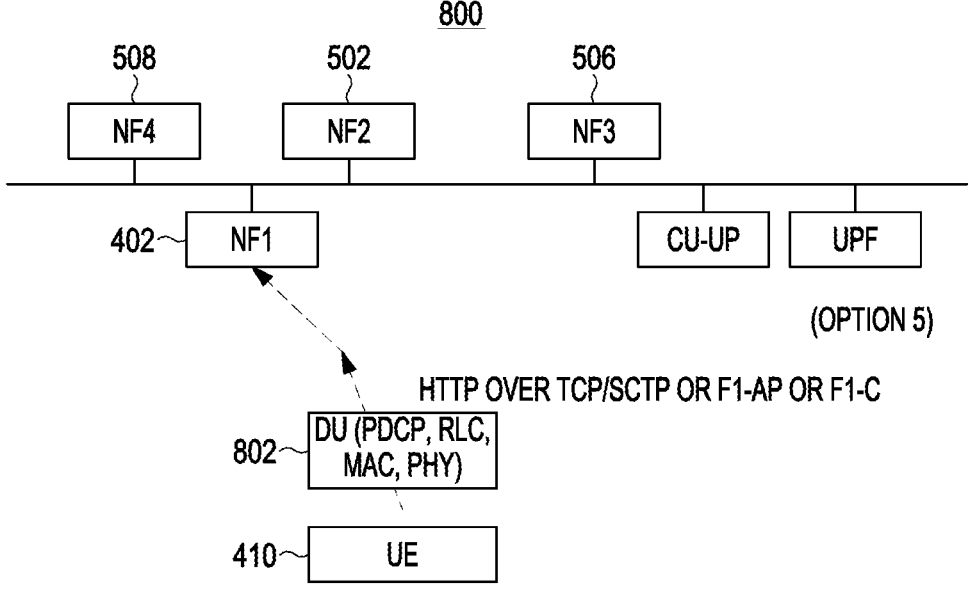

FIGS. 8A and 8B are diagrams 800 illustrating an example PDCP entity as a part of a DU module 802 and may interact with only one NF module, according to various embodiments. In FIGS. 8A and 8B, the PDCP entity is deployed on the DU module 802. In an embodiment, the RLC, MAC, physical layer, and the RF are in the DU module 802. The RF and TRP may be separate units 408.

After the deployment, according to the disclosed design, the PDCP entity may interact with only one of the NF modules present in the Network or the control plane network function modules as shown in FIGS. 8A and 8B. In a non-limiting example, consider that the PDCP entity may interact with only $NF_1$ module 402. The interaction between the $NF_1$ module 402 and the DU module 802 is achieved by the F1-C interface or the F1-U type or the SBI interface.

In an example implementation, consider a case where the UE 410 wants to send a message, then the UE 410 message has to be passed through the $NF_1$ module 410 only. In an embodiment, the DU module 802 needs to be enabled with PDCP functionality and shall support all defined functionality. In an embodiment, the SDAP may be part of the DU module 802 or associated with a module that is handling the CU-UP.

In an embodiment, any new data layer module may be part of the DU module 802 or any other equivalent module. In that case handling of messages will be part of the DU module 802. For example, if any other NF modules wants to send the message to the DU module 802, then the message of any of the other NF modules has to pass through $NF_1$ 402 only.

Figure 9A:
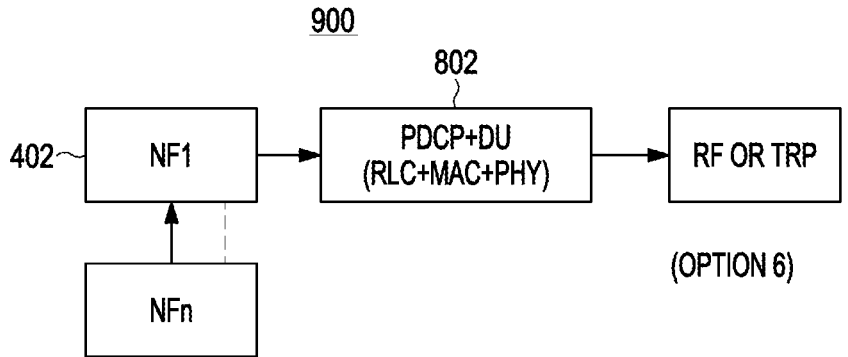
FIGS. 9A and 9B are diagrams illustrating an example PDCP entity is a part of DU module and that may interact with different NFn modules, according to various embodi-ments.
Figure 9B:
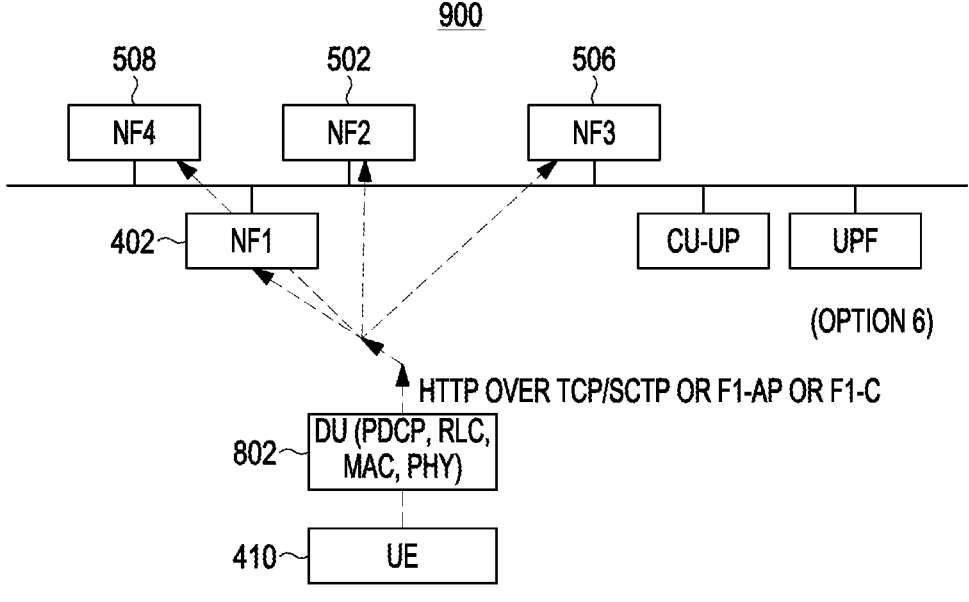

FIGS. 9A and 9B are diagrams 900 illustrating an example PDCP entity as a part of the DU module 802 and may interact with the different $NF_n$ modules, according to various embodiments. In FIG. 9A, the PDCP entity may be deployed on the DU module 802. In an embodiment, the PDCP entity may be deployed on a module that is equivalent to the DU module 802.

After the deployment, according to the disclosed design, the PDCP entity may interact with the different $NF_n$ modules of the Network, or the control network function modules as shown in FIGS. 9A and 9B. In other words, the PDCP entity may interact with each of the NF modules. In an embodiment, the interaction between the PDCP entity and the different $NF_n$ modules is achieved by the interface, like the F1-C interface or F1-U type or SBI interface, that is between the different $NF_n$ modules or multiple network function modules and the DU module 802.

In an embodiment, the DU module 802 needs to be enabled with PDCP functionality and supports all defined functionality. The SDAP may be part of the DU module 802 or associated with a module that is handling the CU-UP. In an embodiment, the RLC, MAC, physical layer, and RF are in the DU module 802, and the RF and TRP may be the separate units 408.

Now, referring back to FIG. 3, after deciding the deployment of the PDCP entity on the RAN module or the different $NF_n$ modules (302), and the interaction with each of the NF modules or the RAN modules based on the deployment of the PDCP entity (304), move to 306 and 308. At 306, the determination whether synchronization is required between the different $NF_n$ modules, and then transmission of the message to the RAN module, or to the NF modules based on the result of the determination of the requirement of the synchronization, at step 308, is explained in greater detail below with reference to FIG. 10.

Figure 10:
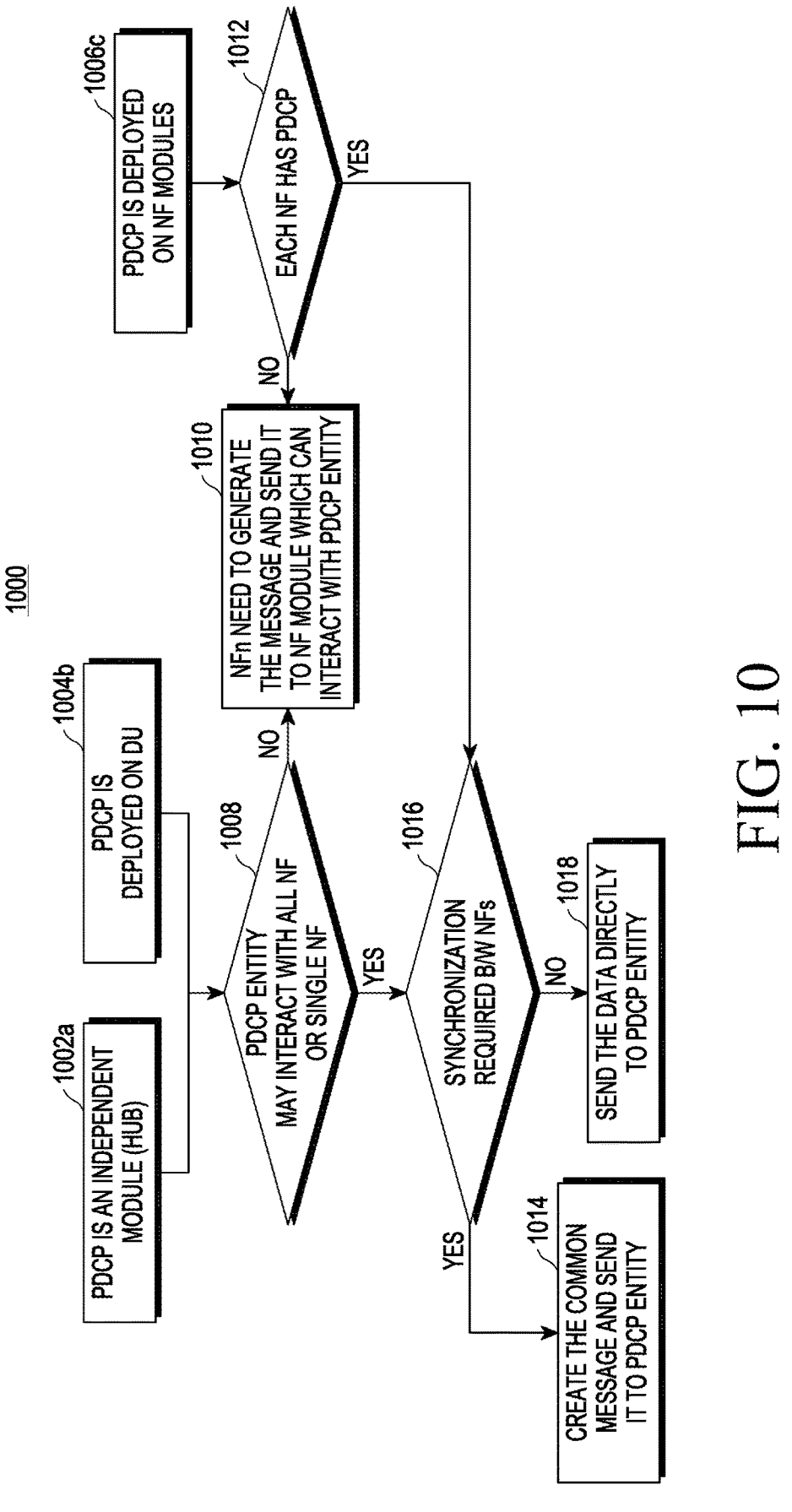
FIG. 10 is a flowchart illustrating example generation of messages based on the placement of the PDCP entity and the interaction between a RAN module and NF modules, according to various embodiments.

FIG. 10 is a flowchart 1000 illustrating example generation of message based on the placement of the PDCP entity and the interaction between a RAN module and the NF modules, according to various embodiments. In FIG. 10, at 1002a, the method 1000 includes the PDCP entity as an independent module, or in other words, the PDCP may be deployed on the HUB module 404. Further, at 1004b, the method 1000 includes the PDCP entity may be deployed on the DU module 406. Further, at 1006c, the method 1000 includes the PDCP entity may be deployed on the different NF modules.

In continuation with 1002a, when the PDCP entity may be deployed on the HUB module 404, at 1008, the method 1000 may include deciding if the PDCP entity may interact with all the different $NF_n$ modules or with a single NF module. Similarly, in continuation with 1004b, when the PDCP entity is being deployed on the DU module 406, at 1008, the method 1000 may include deciding if the PDCP entity may interact with all the different $NF_n$ modules or with the single NF module. Similarly in continuation with 1006c, at 1012, the method 1000 may include deciding if each of the different $NF_n$ modules or, in other words, all the different $NF_n$ modules has the PDCP entity. The different possibilities at 1002a, 1004b, and 1006c, are explained in greater detail below.

Now, consider a case when the PDCP entity may be deployed on the HUB module 404. After deciding that the PDCP entity is being deployed on the HUB module 404, move to 1008. At 1008, the method 1000 may include deciding whether the PDCP entity may interact with all of the different $NF_n$ modules. In other words, deciding whether the PDCP may interact with each of the different $NF_n$ modules. At 1016, the method 1000 may include determining, whether the synchronization is required between all the different $NF_n$ modules. At 1018, if it is determined that the synchronization is not required between all the different $NF_n$ modules, then the message of each of the different $NF_n$ modules is directly transmitted to the common signalling radio bearer (SRB) module. Thereafter, the message is transmitted from the common SRB module to the HUB module 404 where the PDCP entity is deployed. In an embodiment, "each of NF modules" and "each of different NF modules" has been used interchangeably throughout the disclosure and drawings.

In an example implementation consider that the PDCP entity is deployed on the HUB module 404 as shown in FIG. 5A. Further, consider that there are different $NF_n$ modules e.g., the $NF_1$ 402, $NF_2$ 502, $NF_3$ 506, and $NF_4$ 508 modules. The PDCP entity may interact with the $NF_1$ 402, $NF_2$ 502, $NF_3$ 506, and $NF_4$ 508. Thereafter, the method includes determining that the synchronization is not required between the $NF_1$ 402, $NF_2$ 502, $NF_3$ 506, and $NF_4$ 508. Thereafter, the method 1000 may include, on the determination that the synchronization is not required between the $NF_1$ 402, $NF_2$ 502, $NF_3$ 506, and $NF_4$ 508, the message of each of the NF modules e.g., the $NF_1$ 402, $NF_2$ 502, $NF_3$ 506, and $NF_4$ 508 is directly transmitted to the common signalling radio bearer (SRB) module. Thereafter, the message is directly transmitted from the common SRB module to the HUB module 404 where the PDCP entity is deployed.

Referring back to 1018 of FIG. 10, where the PDCP entity may be deployed on the HUB module 404, and determined that the synchronization is required between all the $NF_n$ modules. At 1014, the method 1000 may include sharing the message of each of the NF modules with one or more NF modules that require synchronization. Thereafter, at 1014, the method 1000 may include generating a final message by one or more of the NF modules that requires synchronization. The generation of the final message is based on the message of each of the NF modules. Thereafter, the final message of the one or more NF modules that requires synchronization is sent to the HUB module 404 where the PDCP entity is deployed.

In an example implementation, consider that the PDCP entity is deployed on the HUB module 404 and the PDCP entity may interact with the $NF_1$ 402, $NF_2$ 502, $NF_3$ 506, and $NF_4$ 508 of the Network or the control plane network function modules as shown in FIG. 5A. Thereafter, the method includes determining that the synchronization is required between the $NF_1$ 402 and the $NF_2$ 502. Thereafter, the $NF_1$ 402 and the $NF_2$ 502 may generate the final message as per the requirement of the synchronization. Thereafter, the final message is directly transmitted to the HUB module 404 where the PDCP entity is deployed.

Referring back to 1008 of FIG. 10, where the PDCP entity may be deployed on the HUB module 404 and determining that all the $NF_n$ modules may not interact with the PDCP entity. After determining that all the $NF_n$ modules may not interact with the PDCP entity, move to 1010. At step, the method 1000 includes generating the message by all the $NF_n$ modules. The $NF_n$ module may generate the message and send the final message to an NF module that may interact with the HUB module 404 where the PDCP entity is deployed.

In an example implementation, considering that the $NF_1$ 402, $NF_2$ 502, $NF_3$ 506, and $NF_4$ 508 modules may not interact with the PDCP entity. After determining that the $NF_1$ 402, $NF_2$ 502, $NF_3$ 506, and $NF_4$ 508 modules may not interact with the PDCP entity, the method 1000 includes generating the message by the $NF_3$ 506 module (which is a module from the different $NF_n$ modules). Thereafter, the $NF_3$ 506 module may generate the message, and send the final message to an NF module (it may be either the $NF_1$ 402, $NF_2$ 502, $NF_3$ 506, and $NF_4$ 508) that may interact with the HUB module 404 where the PDCP entity is deployed.

Referring back to 1002a of FIG. 10, where the PDCP entity may be deployed on the HUB module 404. After deciding that the PDCP entity is being deployed on the HUB module 404, move to 1008. At 1008, the method 1000 may include deciding that the PDCP entity may interact with the single NF module. Thereafter, at 1016, the method 1000 may include determining, whether the synchronization is required or not required between all the different $NF_n$ modules based on the decision that the PDCP entity may interact with the single NF module. Thereafter, at 1018, if it is determined that the synchronization is not required between all the different NF modules, then the message of the single NF module is directly transmitted to the common signaling radio bearer (SRB) module. Thereafter, the message is transmitted from the common SRB module to the HUB module 404 where the PDCP entity is deployed.

In an example implementation, consider that the PDCP entity is deployed on the HUB module 404 as shown in FIG. 4a. Further, consider that the PDCP entity may interact with only one of the NF modules e.g., the $NF_1$ 402, Thereafter, the method includes determining that the synchronization is not required between the $NF_1$ 402, $NF_2$, $NF_3$, and $NF_4$. Thereafter, the method 1000 may include, on the determination that the synchronization is not required between the $NF_1$ 402, $NF_2$, $NF_3$, and $NF_4$, then the message of the $NF_1$ 402 is directly transmitted to the common signaling radio bearer (SRB) module. Thereafter, the message is transmitted from the common SRB module to the HUB module 404 where the PDCP entity is deployed.

Referring back to 1018 of FIG. 10, where the PDCP entity may be deployed on the HUB module 404, and the PDCP entity may interact with only the single NF module. Thereafter, at 1008, determined that the synchronization is required between all the different $NF_n$ modules. Then, move to 1014. At 1014, the method 1000 may include sharing the message of the single NF module with one or more of the NF modules that requires synchronization. Thereafter, the method 1000 includes generating the final message by the one or more of the NF modules that requires synchronization. The generation of the final message is based on the message of each of the different $NF_n$ modules. Thereafter, the final message of the one or more NF modules that requires synchronization is sent to the first NF module. Thereafter, transmitting the final message by the first NF module to a common signaling radio bearer (SRB) module.

In an example implementation consider that the PDCP entity is deployed on the HUB module 404 and the PDCP entity may interact with the $NF_1$ 402 (the first NF module), as shown in FIG. 4a. Thereafter, the method includes determining that the synchronization is required between the $NF_1$ 402, $NF_2$, $NF_3$, and $NF_4$. Thereafter, the $NF_1$ 402 message is shared with, say for example, the $NF_2$, $NF_3$, and $NF_4$ that require synchronization. Thereafter, the final message is generated by the $NF_2$, $NF_3$, and $NF_4$ that require synchronization. Thereafter, the final message is sent to the $NF_1$ 402. Then, this final message is sent to the common SRB. Thereafter, the final message is transmitted to the HUB module 404 where the PDCP entity is deployed.

Referring back to 1004b of FIG. 10, where the PDCP may be deployed on the DU module 802. In continuation with 1004b, consider a case when the PDCP entity is being deployed on the DU module 802. After deciding that the PDCP entity is being deployed on the DU module 802, move to 1008. At 1008, the method 1000 may include deciding whether the PDCP entity may interact with all of the different $NF_n$ modules or not. In other words, deciding whether the PDCP may interact with each of the different $NF_n$ modules. Thereafter, at 1016, the method 1000 may include determining, whether the synchronization is required or not required between all the different $NF_n$ modules. Thereafter, at 1018, if it is determined that the synchronization is not required between all the different $NF_n$ modules, then the message of each of the different $NF_n$ modules is directly transmitted to the common signaling radio bearer (SRB) module. Thereafter, the message is transmitted from the SRB module to the DU module 802 where the PDCP entity is deployed.

In an example implementation, consider that the PDCP entity is deployed on the DU module 802 as shown in FIG. 9A. Further, consider that all the $NF_n$ modules include the $NF_1$ 402, $NF_2$ 502, $NF_3$ 506, and $NF_4$ 508. Then in that case, the PDCP entity may interact with the $NF_1$ 402, $NF_2$ 502, $NF_3$ 506, and $NF_4$ 508. Thereafter, the method includes determining that the synchronization is not required between the $NF_1$ 402, $NF_2$ 502, $NF_3$ 506, and $NF_4$ 508. Thereafter, the method 1000 may include, on the determination that the synchronization is not required between the $NF_1$ 402, $NF_2$ 502, $NF_3$ 506, and $NF_4$ 508, the message of each of the NF modules e.g., the $NF_1$ 402, $NF_2$ 502, $NF_3$ 506, and $NF_4$ 508 is directly transmitted to the common signalling radio bearer (SRB) module. Thereafter, the message is directly transmitted from the common SRB module to the DU module 802 where the PDCP entity is deployed.

Referring back to 1018 of FIG. 10, where the PDCP entity may be deployed on the DU module 802, and determined that the synchronization is required between all the different $NF_n$ modules. Then, at 1014, the method 1000 may include sharing the message of each of the different $NF_n$ modules with one or more different NF modules that require synchronization. Thereafter, at 1014, the method 1000 may include generating the final message by the one or more different NF modules that require synchronization. The generation of the final message is based on the message of each of the different $NF_n$ modules. Thereafter, the final message of the one or more different NF modules that requires synchronization is sent to the DU module 802 where the PDCP entity is deployed.

In an example implementation, consider that the PDCP entity is deployed on the DU module 802 and the PDCP entity may interact with the $NF_1$ 402, $NF_2$ 502, $NF_3$ 506, and $NF_4$ 508 as shown in FIG. 9A. Thereafter, the method includes determining that the synchronization is required between the $NF_1$ 402 and $NF_2$ 502. Thereafter, the $NF_1$ 402 and $NF_2$ 502 may generate the final message as per the requirement of the synchronization. Thereafter, the final message is directly transmitted to the DU module 802 where the PDCP entity is deployed.

Referring back to 1008 of FIG. 10, where the PDCP entity may be deployed on the DU module 802 and determining that all the different $NF_n$ modules may not interact with the PDCP entity. After determining that all the different $NF_n$ modules may not interact with the PDCP entity, move to 1010. At 1010, the method 1000 includes generating of a message by the $NF_n$ module. The $NF_n$ module may generate the message and send to the NF module that may interact with the DU module 802 where the PDCP entity is deployed.

In an example implementation, considering that the $NF_1$ 402, $NF_2$ 502, $NF_3$ 506, and $NF_4$ 508 modules may not interact with the PDCP entity. After determining that the $NF_1$ 402, $NF_2$ 502, $NF_3$ 506, and $NF_4$ 508 modules may not interact with the PDCP entity, the method 1000 includes generating of the message by the $NF_3$ 506 module (which is a module from the $NF_n$ module). Thereafter, the $NF_3$ 506 module may generate the message and send to the NF module (it may be either of the NF modules from $NF_1$ 402, $NF_2$ 502, $NF_3$ 506, and $NF_4$ 508) that may interact with the DU module 802 where the PDCP entity is deployed.

Referring back to 1004b of FIG. 10, where the PDCP entity may be deployed on the DU module 802. After deciding that the PDCP entity is deployed on the DU module 802, move to 1008. At 1008, the method 1000 may include deciding that the PDCP entity may interact with the single NF module. Thereafter, at 1016, the method 1000 may include determining, whether the synchronization is required or not required between all the different $NF_n$ modules. Thereafter, at 1018, if it is determined that the synchronization is not required between all the different $NF_n$ modules, then a message of the single NF module is directly transmitted to the common signaling radio bearer (SRB) module. Thereafter, the message is transmitted from the SRB module to the DU module 802 where the PDCP entity is deployed.

In an example implementation, consider that the PDCP entity is deployed on the DU module 802 as shown in FIG. 8A. Further, consider that the PDCP entity may interact with only $NF_1$ 402, Thereafter, the method includes determining that the synchronization is not required between the $NF_1$ 402, $NF_2$ 502, $NF_3$ 506, and $NF_4$ 508. Thereafter, the method 1000 may include, on the determination that the synchronization is not required between the $NF_1$ 402, $NF_2$ 502, $NF_3$ 506, and $NF_4$ 508, then the message of the $NF_1$ 402 is directly transmitted to the common SRB module. Thereafter, the message is transmitted from the common SRB module to the DU module 802 where the PDCP entity is deployed.

Referring back to 1018 of FIG. 10, where the PDCP entity may be deployed on the DU module 802, and the PDCP entity may interact with only the single NF module. Thereafter, at 1008, determined that the synchronization is required between all the different $NF_n$ modules. Then, move to 1014. At 1014, the method 1000 may include sharing the message of the single NF module with one or more of the different $NF_n$ modules that requires synchronization. Thereafter, the method 1000 includes generating the final message by the one or more of the NF modules that requires synchronization. The generation of the final message is based on the message of each of the different $NF_n$ modules. Thereafter, the final message of the one or more different $NF_n$ modules that requires synchronization is sent to the first NF module. Thereafter, transmitting the final message by the first NF module to the common SRB module.

In an example implementation, consider that the PDCP entity is deployed on the DU module 802 and the PDCP entity may interact with the $NF_1$ 402 as shown in FIG. 8a. Thereafter, the method includes determining that the synchronization is required between the $NF_1$ 402, $NF_2$ 502, $NF_3$ 506, and $NF_4$ 508. Thereafter, the $NF_1$ 402 message is shared with, say for example, the $NF_2$ 502, $NF_3$ 506, and $NF_4$ 508 that requires synchronization. Thereafter, the final message is generated by the $NF_2$ 502, $NF_3$ 506, and $NF_4$ 508 that requires synchronization. Thereafter, the final message is sent to the $NF_1$ 402. Then, this final message is sent to the common SRB. Thereafter, the final message is transmitted to the DU module 802 where the PDCP entity is deployed.

Referring back to 1006c of FIG. 10, where the PDCP may be deployed on NF modules and the determination that the PDCP entity interacts with the RAN module corresponding to the DU module 802. After the determination, the method 1000 may include, at 1012, determining whether each of the NF modules has the PDCP entity. After determining, that each of the NF modules has not the PDCP entity, move to 1010. In other words, the PDCP entity may be only on the single NF module. Thereafter, at 1010, the method 1000 may include generating the message of each of the NF modules except the second NF module. The message is generated by each of the NF modules except the second NF module. Thereafter, the method 1000 may include sending the generated message of each of the NF modules to the NF module that interacts with the DU module 802.

In an example implementation, consider that the PDCP entity is deployed on the single NF module $NF_1$ 602 as shown in FIG. 6A, and the determination that the PDCP entity interacts with the RAN module corresponding to the DU module. Thereafter, the method includes generating the message by the $NF_n$ modules. The $NF_n$ modules may include but not limited to $NF_1$ 402, $NF_2$ 502, $NF_3$ 506, and $NF_4$ 508. For example, the $NF_3$ 506, and $NF_4$ 508 may generate the message except the $NF_1$ with the PDCP entity. Thereafter, the generated message is sent to the $NF_1$ with the PDCP entity 602 that interacts with the DU module 802.

Referring back to 1012 of FIG. 10, where it is determined that each of the NF modules has the PDCP entity in case the PDCP entity is deployed on the $NF_n$ modules, and the determination that the PDCP entity interacts with the RAN module corresponding to the DU module 802. Thereafter, at 1016, the method 1000 includes determining whether the synchronization is required between the different $NF_n$ modules. After determining that the synchronization is required between the different $NF_n$ modules, the method 1000, at 1014 includes sharing the message of each of the different NF modules with one or more of the different $NF_n$ modules that require synchronization based on the determination that the synchronization is required between the different $NF_n$ modules. Thereafter, the method includes generating the final message by the one or more of the different $NF_n$ modules that requires synchronization. The generation of the message is based on the shared message. Thereafter, the method includes sending the final message to each of the different $NF_n$ modules. Thereafter, the method includes transmitting the final message by each of the different NF modules to the common SRB module.

In an example implementation, consider that the PDCP entity is deployed on each of the different $NF_n$ modules e.g., the $NF_1$ with PDCP entity 602, the $NF_2$ with PDCP entity

704, the $NF_3$ with PDCP entity 706, and the $NF_4$ with PDCP entity 702 as shown in FIG. 7A. The PDCP entity may interact with the DU module 802. Thereafter, the method includes determining that the synchronization is required between the $NF_1$ 402, $NF_2$ 502, $NF_3$ 506, and $NF_4$ 508 modules. Further, consider that the $NF_1$ 402, $NF_2$ 502, $NF_3$ 506, and $NF_4$ 508 modules messages are to share with the different $NF_n$ modules, say for example, the $NF_3$ 506, and the $NF_4$ 508 which requires synchronization. Thereafter, the final message is generated by the $NF_3$ 506, and the $NF_4$ 508 that requires synchronization. Thereafter, the final message is sent to the $NF_1$ 402, $NF_2$ 502, $NF_3$ 506, and $NF_4$ 508. Then, this final message is sent by the $NF_1$ 402, $NF_2$ 502, $NF_3$ 506, and $NF_4$ 508 to the common SRB.

Referring back to 1012 of FIG. 10, where it is determined that each of the different NF modules has the PDCP entity, and the determination that the PDCP entity interacts with the RAN module corresponding to the DU module 802, then move to 1016. At 1016, the method 1000 includes determining whether the synchronization is required between the different $NF_n$ modules. After determining that the synchronization is not required between the different $NF_n$ modules, the method 1000, at 1018 includes transmitting the message of each of the different $NF_n$ modules to the common SRB module.

Now, referring back to FIG. 3, where at 304, it is determined that the PDCP entity (deployed on the RAN modules) may interact with the different $NF_n$ modules. The interaction between the PDCP entity with the different $NF_n$ modules is done through the common SRB. In an embodiment, various design options are defined for the common SRB through which the RAN modules (for example the HUB 404 and the DU 406 modules) on which the PDCP entity is deployed may interact with the different $NF_n$ modules. The various design options are explained with the help of FIG. 11 in the forthcoming paragraphs.

Figure 11:
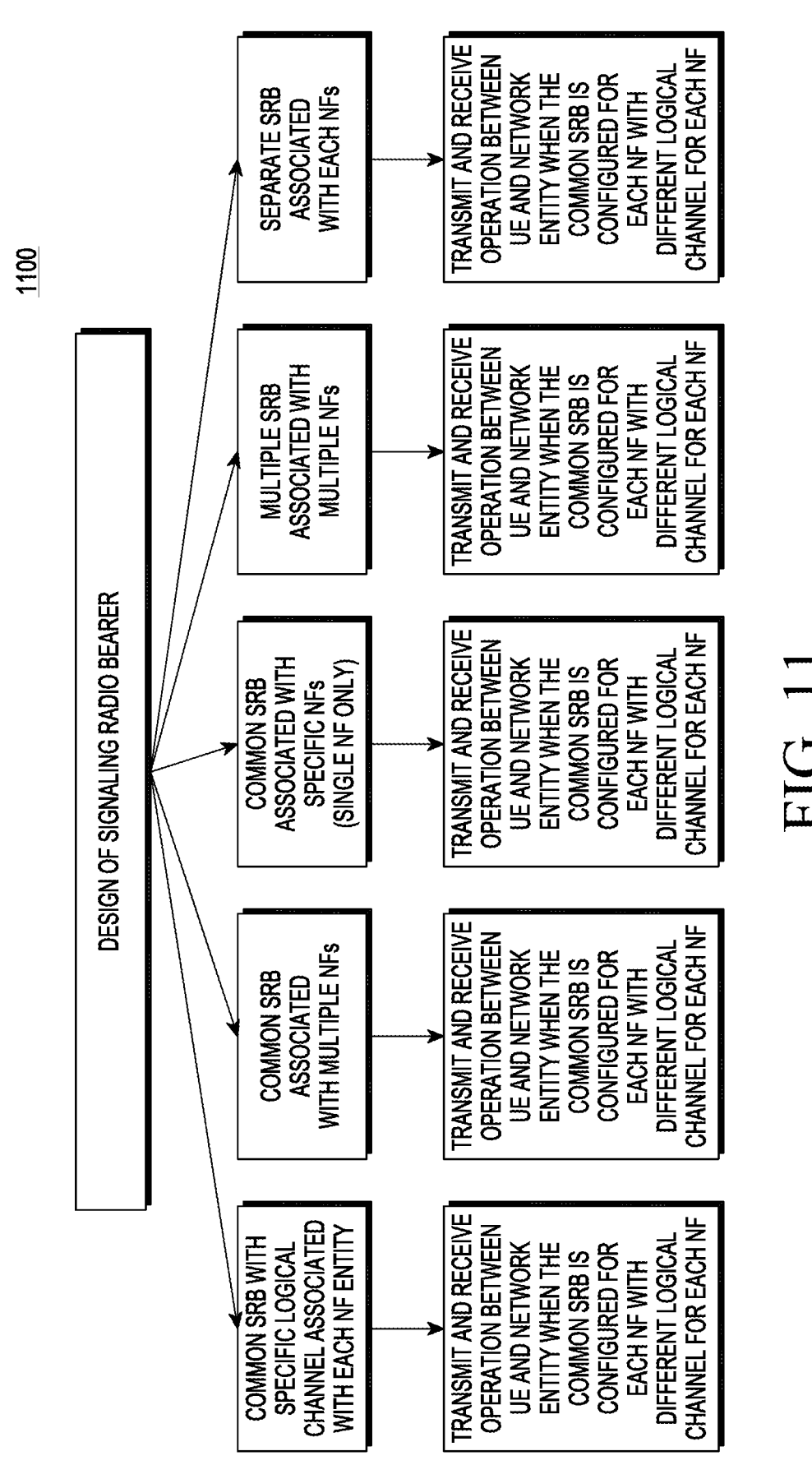
FIG. 11 is a diagram illustrating various example design options for a common SRB through which the RAN mod-ules (the DU or the HUB modules) may interact with the NF modules, according to various embodiments.

FIG. 11 is a diagram illustrating various example design options for the common SRB through which the RAN modules (the DU or the HUB modules) may interact with the different $NF_n$ modules, according to various embodiments. In FIG. 11, various design options are defined for the common SRB through which the RAN modules (the DU or the HUB modules) may interact with the different $NF_n$ modules. These designs are further explained in greater detail below with reference to FIGS. 12-25.

Figure 12A:
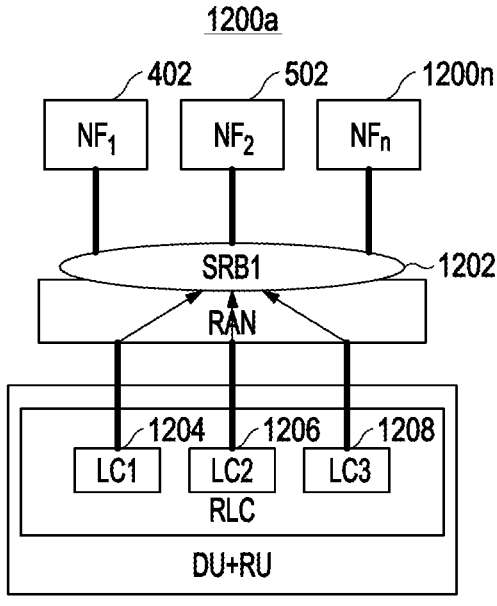
FIGS. 12A and 12B are diagrams illustrating example designs of a single common SRB with a specific logical channel associated with each of different NF modules, according to various embodiments.
Figure 12B:
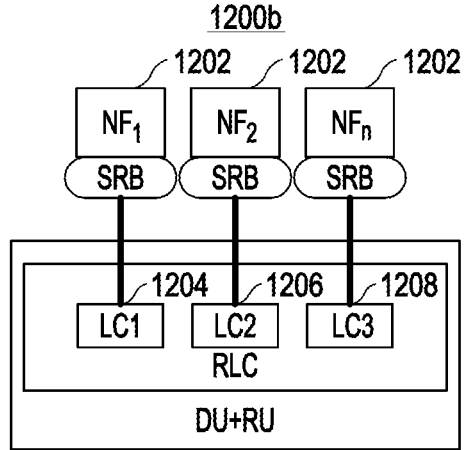

FIGS. 12A and 12B are diagrams 1200a and 1200b illustrating example designs of the single common SRB with the specific logical channel associated with each of the different NF modules, according to various embodiments. In FIG. 12A, consider the case when the PDCP entity is deployed on the RAN module. The PDCP entity in the RAN module may refer to the PDCP entity being deployed on the HUB module 404, which is either an independent module or may be deployed on the DU module 406. Now, the design further explains that there is the single common SRB configured for each of the different $NF_n$ modules with different logical channels. In other words, the common SRB may be split across the different logical channels depending on the number of the different $NF_n$ modules configured in the Network. For example, the single common SRB is the SRB1 1202. The SRB1 1202 may be configured for the $NF_1$ 402, $NF_2$ 502, and the $NF_n$ 1200n with the logical channels $LC_1$ 1204, $LC_2$ 1206, and $LC_3$ 1208, respectively.

In an example implementation, consider an example where the PDCP entity may be deployed on the RAN module, and the single common SRB1 1202 is configured with the $LC_1$ 1204, $LC_2$ 1206, and $LC_3$ 1208 associated with the $NF_1$ 402, $NF_2$ 502, and $NF_n$ 1200n, respectively. Further, consider that $NF_1$ and $NF_2$ send messages. These messages are sent over the SRB1 1202. Thereafter, mapping of the messages received over the SRB1 1202 is performed on a specific logical channel. The specific logical channel may be the $LC_1$ 1204, $LC_2$ 1206, $LC_3$ 1208. The mapping of the SRB message may be performed by the PDCP entity, as the PDCP entity is aware that it receives a message from which of the NF module. Accordingly, the PDCP entity sends that message to the specific logical channel only. So, here in the given example, the PDCP entity is aware that the $NF_1$ 402, $NF_2$ 502 have sent the message, and therefore the mapping of the SRB message will be done with the logical channel $LC_1$ 1204, $LC_2$ 1206. So, the $NF_1$ 402, $NF_2$ 502 message will be sent to the logical channel $LC_1$ 1204, and $LC_2$ 1206.

In an embodiment, there may be a single common SRB configured between the UE and the Network, but each of the different $NF_n$ modules may be mapped to a different logical channel with different priorities. In an embodiment, there may be a different priority of messages over the multiple RLC or the logical channels.

In an embodiment, it is discussed that there is no need for any identifier as the LC will reflect that the message is for which of the NF modules. The identification of the NF modules may be done through the Logical channel IDs, as the Network may configure a separate logical channel for each of the different $NF_n$ modules. The Network may share this info with the UE 410 based on the RRC or any equivalent message. These logical channels may be pre-configured also between the UE 410 and the Network.

In FIG. 12B, consider a case when the PDCP entity is deployed on the different $NF_n$ modules. Now, the design further explains that there is the single common SRB configured for each of the different $NF_n$ modules with the different logical channels. In other words, the common SRB may be split across the different logical channels depending on the number of the NF modules configured in the Network. For example, the single common SRB is the SRB1 1202. The SRB1 1202 may be configured for $NF_1$ 402, $NF_2$ 502, and the $NF_n$ 1200n with the logical channels $LC_1$ 1204, $LC_2$ 1206, and $LC_3$ 1208, respectively. Thereafter, mapping of the messages received over the SRB1 1202 is performed on a specific logical channel. The specific logical channel may be the $LC_1$ 1204, $LC_2$ 1206, $LC_3$ 1208. The mapping of the SRB message may be performed by the PDCP entity, as the PDCP entity is aware that it receives message from which of the NF module. Accordingly, the PDCP entity sends that message to the specific logical channel only. So, here in the given example, the PDCP entity is aware that the $NF_1$ 402, $NF_2$ 502 have sent the message, and therefore the mapping of the SRB message will be done with the logical channel $LC_1$ 1204, and $LC_2$ 1206. So, the $NF_1$ 402, $NF_2$ 502 message will be send to the logical channel $LC_1$ 1204, and $LC_2$ 1206.

In an example embodiment, consider that the UE 410 wants to transmit the message to the different $NF_n$ modules. Then in that case the UE 410 sends the message to the SRB1 1202. Thereafter, mapping of the messages received over the SRB1 1202 is performed on the specific logical channel. Thereafter, the SRB 1202 message is sent to that NF module for which the UE 410 has sent the message. The same flow is applicable when the message is sent from the UE 410 to the Network function side.

After, associating the single common SRB with the specific logical channels associated with each of the NF modules, the handling of the transmission operation between the UE 410 and the Network is explained in greater detail below with reference to FIG. 13.

FIG. 13 is a flowchart 1300 illustrating example handling of the transmission operation between the UE and the Network, according to various embodiments. In FIG. 13, considering that the PDCP entity is deployed on the RAN module, and the determination that the PDCP entity interacts with each of the NF modules, and the determination that the synchronization is not required between the different $NF_n$ modules. Consider a case where the $NF_1$ 402, $NF_2$ 502, till $NF_n$ 1200$_n$ are present in the Network. So, at 1302, the single common SRB is configured for each of the NF modules with the different logical channels. The different logical channels are configured for each of the NF modules. Thereafter, at 1304, determining whether the first NF module from the plurality of the NF modules wants to transmit the message. For example, consider that the $NF_1$ 402 wants to transmit the message. Thereafter, at 1306, it is determined whether the synchronization is required between the plurality of the NF modules. In case the synchronization is not required between the plurality of the NF modules, then move to 1308. At 1308, the message of the first NF module is transmitted to the single common SRB module e.g., the message of the $NF_1$ 402 is transmitted to the SRB1 1202. Thereafter, at 1314, the message received on the common SRB module is mapped with respect to the specific logical channel (LC), wherein the message is transmitted through each of the LC to the RAN module. Thereafter, the RAN module may send the message to the UE 410.

Referring back to 1306, if it is determined that the synchronization is required between the different $NF_n$ modules, then move to 1310. At 1310, the message of the first NF module e.g., the $NF_1$ 402 is shared with any one of the NF modules that requires synchronization except the first NF module e.g., the NF1 402. Thereafter, at 1312, a final message is created by any one of the NF modules that requires synchronization except the first NF module and transmitted to the single common SRB module. Thereafter, at 1314, the message received on the single common SRB module is mapped with respect to the specific logical channel (LC) from the plurality of LC, wherein the SRB message is transmitted through each of the LC to the RAN module.

In an embodiment, the mapping of the SRB message over the specific logical channel is disclosed. The mapping of the SRB message over a specific Logical channel is performed by the PDCP entity, as the PDCP entity is aware that from which of the NF module the message is received. Accordingly, the PDCP entity will send the message to the specific logical channel only. Thereafter, the PDCP entity may inform the lower layers about the NF module which has sent the message. In this case, the PDCP entity or any other layer informs the lower layers like the RLC, the MAC, etc. that this particular message is from which of the NF module, or it may inform the lower layers about the logical channel that carries the NF module message. This is based on a table maintained at the PDCP entity. The table is made based on the message and the corresponding logical channel. In other words, the table includes the message and the corresponding logical channel. Thereafter, the RAN module may map the message to the specific logical channel. In an embodiment, the DU module 406 based on information from upper layers will process the message for the specific logical channel and send it to the UE 410 based on conventional schemes.

In an embodiment, the procedure for mapping of the SRB message over the specific Logical channel is performed by the network. The network may map each of the NF modules to the specific logical channel. The number of the logical channel depends upon the number of the NF modules configured. Each of the NF modules corresponds to the specific logical channel only. This configuration may be sent to the DU module 406 as well as to the UE 410.

Figure 26:
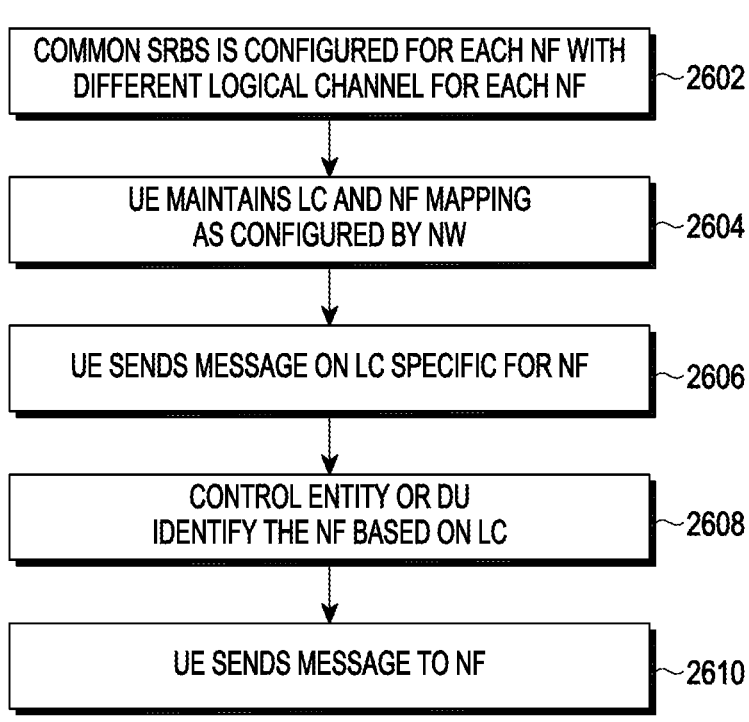
FIG. 26 is a flowchart illustrating example handling of the receive operation between the UE and the Network, according to various embodiments.

FIG. 26 is a flowchart 2600 illustrating example handling of the receive operation between the UE and the Network, according to various embodiments. Considering that the PDCP entity is deployed on the RAN module. After, the deployment of the PDCP entity, at 2602, configuring each of the different $NF_n$ modules with the single common SRB module. Thereafter, at 2604, mapping each of the NF modules with respect to the specific logical channel (LC) is done. Here, the UE maintains the LC, and the NF mapping is configured by the network. Thereafter, at 2606, the UE 410 sends the message on the specific LC for the NF module. Thereafter, at 2608, identifying the NF module that is mapped with the specific LC from the plurality of the LC is done. The RAN module or the DU module 406 identifies the NF module based on the specific LC at 2608. Thereafter, the message is sent to the identified NF module, at 2610.

Figure 14A:
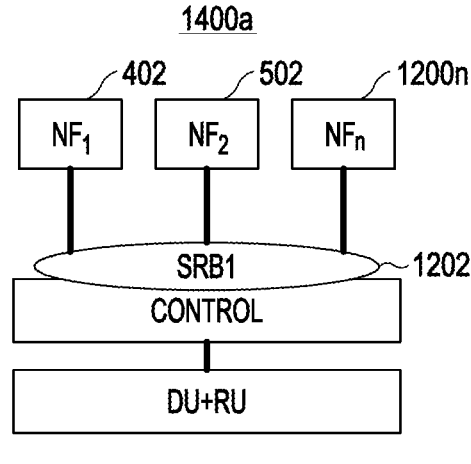
FIGS. 14A and 14B are diagrams illustrating example designs of a common SRB associated with different NFn modules, according to various embodiments.
Figure 14B:
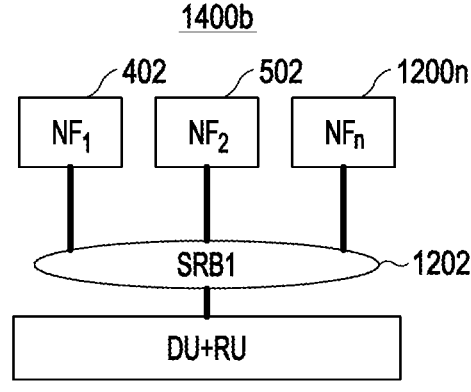

FIGS. 14A and 14B are diagrams 1400a and 1400b illustrating example designs of the common SRB associated with the different $NF_n$ modules, according to various embodiments. In FIG. 14A, consider the case when the PDCP entity is deployed on the RAN module corresponding to a switch. The RAN module may include the HUB module 404, the CMD, or the DU module 406. In this design, the single common SRB is configured with each of the different $NF_n$ modules. For example, the single common SRB 1202 is configured with the $NF_1$ 402, $NF_2$ 502, and $NF_n$ 1200$_n$ modules. The single common SRB is used to send and transmit the message from any of the different $NF_n$ modules, like for example from the $NF_1$ 402, $NF_2$ 502, and $NF_n$ 1200$_n$ modules to the HUB module 404 or the CMD or the switch. Once the CMD or the HUB module 404 or the switch receives the message sent by any one of the different $NF_n$ modules, say for example from the $NF_1$ 402 module, the CMD or the HUB module 404 or the switch has to identify the NF module where this message may be processed. There may be multiple possibilities through which this may be done like from header of the message which signifies this message is for which NF modules. It may have an NF header field. This may be based on an L1 header or layer 2 headers like SDAP, PDC, RLC, MAC, etc, or based on a layer 3 message header like RRC or core network message header. The NW may configure the different header fields associated with the different NF or it may be preconfigured where say the $NF_1$ corresponds to 000, $NF_2$ corresponds to 001, etc.

In FIG. 14B, consider the case when the PDCP entity is deployed on the different NF modules. In this design, the single common SRB is terminating at the different NF modules. For example, the single common SRB 1202 is terminating at the $NF_1$ 402, $NF_2$ 502, and $NF_n$ 1200$_n$ modules. In this case, consider that UE 410 sends a message to the NF module. The message will be sent through the common SRB to the DU module 404. Then, based on the message received at the DU module 406, the DU module 406 identifies that the message sent by the UE 410 is for which NF module. The DU entity 406 may identify through based on the L1 header or layer 2 headers like SDAP, PDCP, RLC, MAC, etc. The UE 410 or the network while forming the packet will add this information.

After, associating the single common SRB with the multiple different $NF_n$ modules, the handling of transmit operation between the UE 410 and the Network is described in greater detail below with reference to FIG. 15.

Figure 15:
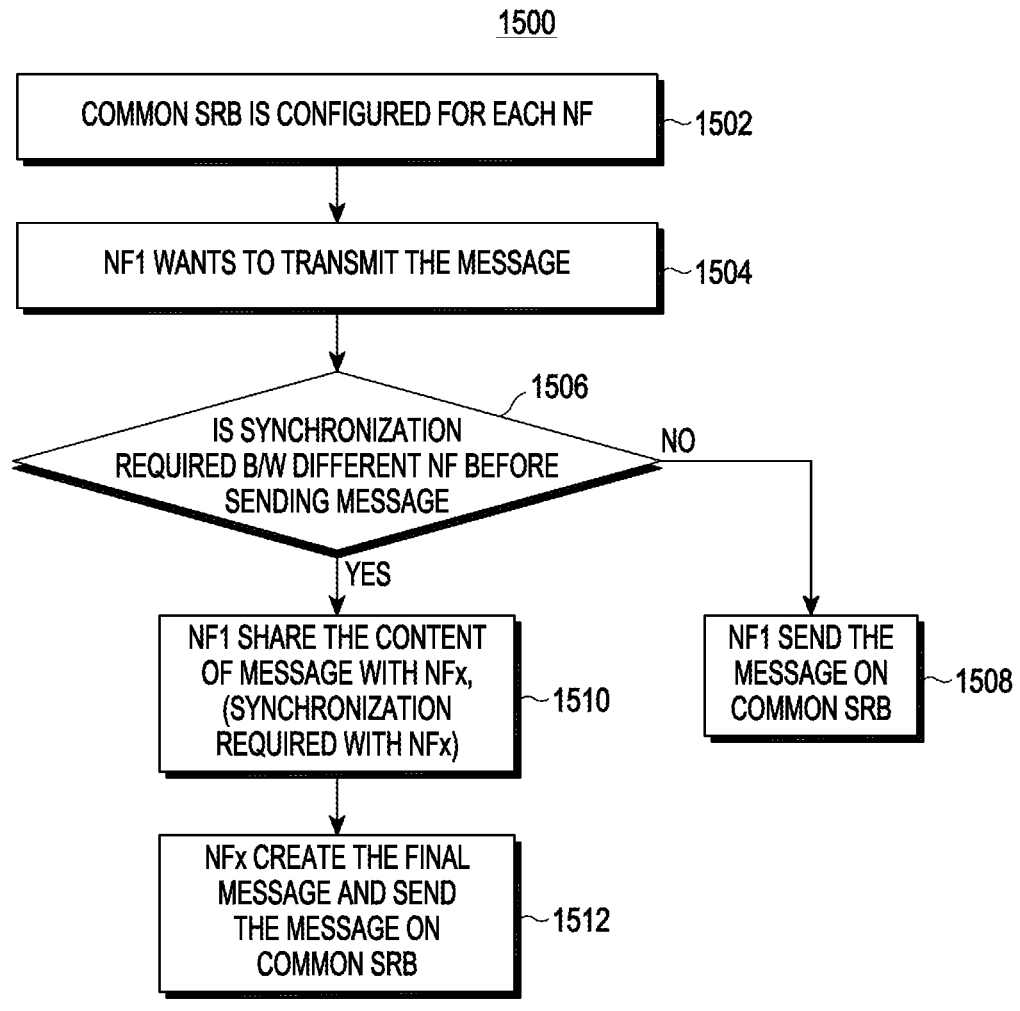
FIG. 15 is a flowchart illustrating example handling of a transmit operation between UE and Network, according to various embodiments.

FIG. 15 is a flowchart 1500 illustrating example handling of a transmit operation between the UE and the Network, according to various embodiments. Consider a case where the $NF_1$ 402, $NF_2$ 502, till $NF_n$ 1200$_n$ are present in the Network. So, at 1502, the common single SRB 1202 is configured for each of the different $NF_n$ modules e.g., for the $NF_1$ 402, $NF_2$ 502, and $NF_n$ 1200$_n$. The common single SRB 1202 is configured by the Network. This refers to $NF_1$ 402, $NF_2$ 502, and $NF_n$ 1200$_n$ may transmit the message through the single common SRB 1202 only. In an embodiment, the Network provides the same configuration at the UE 410 and configures the common SRB for the transfer and reception of all the messages. Thereafter, at 1504, determining whether the first NF module, say for example $NF_1$ 402, wants to transmit the message. Thereafter, at 1506, determining whether the synchronization is required between all the NF modules before sending the message of the first NF module. If the synchronization is not required between the NF modules, then move to 1508. At 1508, the message of the first NF module is transmitted to the configured common SRB module.

Referring back to 1506, where it is determined that the synchronization is required between the different NF modules, then move to 1510. At 1510, the message of the first NF module is shared with any one of the different $NF_n$ modules that requires synchronization. Thereafter, at 1512, a final message is created by any one of the different NF modules that require synchronization, and then the final message is sent to the common SRB.

In an example implementation, consider that the $NF_1$, $NF_2$ . . . till $NF_n$ are present in the network as shown in FIG. 14A. At the first step, the common SRB is configured for the $NF_1$, $NF_1$, $NF_2$ . . . till $NF_n$. Further, in the next step, consider that the $NF_1$ 402 want to transmit the message to the UE 410. Then, in the next step, consider a case where it is determined whether synchronization is required between the $NF_1$ 402 and $NF_2$ 502, before sending the message. In an embodiment, the synchronization required between the different $NF_n$ modules is disclosed. There are a few messages that may require synchronization between the $NF_1$ 402, $NF_2$ 502, and the $NF_n$ 1200$n$, and then that messages are needed to send through specific NF only. As an example, say the DRB configuration message is with the $NF_1$ 402, and the PHY and MAC configuration is with another NF say $NF_2$ 502. So, coordination is required between the two NFs e.g., the $NF_1$ 402 and the $NF_2$ 502 before sending the message to the UE 410. The NF module also sends the synchronization required to $NF_2$ through some content of the message or through the separate message.

Thereafter, in the next step, the $NF_1$ 402 sends the message on the common SRB 1202. In case, if no synchronization is required between the $NF_1$ 402 and $NF_2$ 502 modules, then the message is sent through either the $NF_1$ 402 or $NF_2$ 502 (a module that generates a message). In case, it is determined that the synchronization is required between the $NF_1$ 402 and $NF_2$ 502 modules, then $NF_1$ 402 shares the message with $NF_2$ 502 (synchronization required with $NF_2$ 502). In this case the $NF_1$ 402 shares all information elements and other required information which is needed to send to UE and take some decision at other NF modules. As an example, it may indicate that there is a handover procedure, then in that case the other NF modules need to take action accordingly. Thereafter, in the next step, the $NF_2$ 502 creates the final message and sends the final message on the common SRB. In an embodiment, the $NF_2$ 502 may be a module that has generated the message, or the module that has generated the final message, or the module that may send the message on the common SRB only.

In an example implementation, consider that the PDCP entity is deployed on the NF module and the common SRB is terminating at the NF module 1202 as shown in FIG. 14b. In this case, suppose the UE 410 wants to send a message to the $NF_1$ 402. Then in that case, based on the information received at the DU module 406, the DU module 406 identifies that the UE 410 message is for the $NF_1$ 402 module. The identification is based on the L1 header or the layer 2 header of the PDCP entity.

Figure 16:
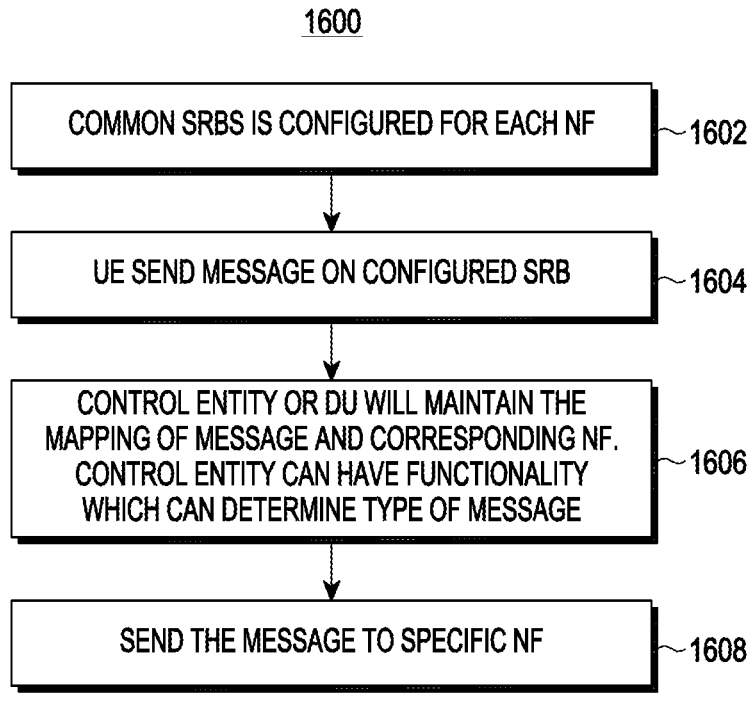
FIG. 16 is a flowchart illustrating example handling of a receive operation between a UE and a Network, according to various embodiments.

FIG. 16 is a flowchart 1600 illustrating example handling of receive operation between the UE and the Network, according to various embodiments. Considering that the PDCP entity is deployed on the RAN module corresponding to the switch. After, the deployment of the PDCP entity, at 1602, the common SRB is configured for each of the NF modules. For example, the common SRB1 1202 is configured for the $NF_1$ 402 module. Likewise, the common SRB1 1202 is configured for the $NF_2$ 502 and so on till $NF_n$ 1200$_n$. Thereafter, at 1604, the UE 410 sends the message on the configured common SRB. Thereafter, at 1606, the mapping of the message with respect to the corresponding NF module is done. The switch maintains the mapping of the message with the corresponding NF module. The switch may have functionality that may determine the type of message. Thereafter, at 1608, the message is sent to the mapped NF module.

Figure 17A:
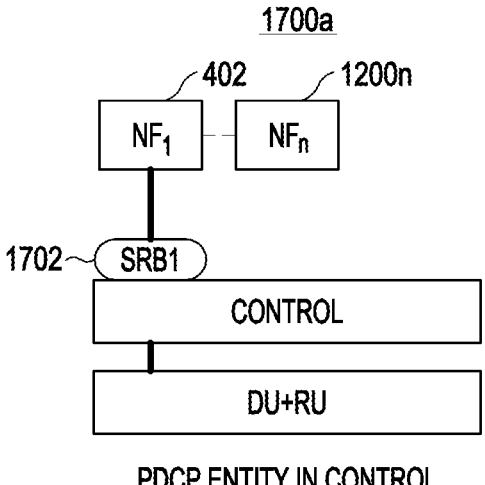
FIGS. 17A and 17B are diagrams illustrating example designs of a common SRB associated with specific NFs, according to various embodiments.
Figure 17B:
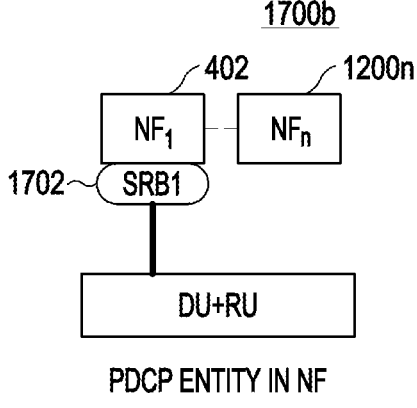

FIGS. 17A and 17B are diagrams 1400a and 1400b illustrating example designs of the common SRB associated with the specific NFs, according to various embodiments. In FIG. 17A, consider the case when the PDCP entity is deployed on the RAN module. In this design, the common SRB may be configured with access to the single NF only. In an embodiment, all the messages will go through the single NF only, for example, $NF_1$ 402 in this case. In the case of transmission and reception of the messages between the multiple NFs and the UE 410, the single SRB may be used to transmit and receive the message between the multiple NFs and the UE 410. In other words, only one NF module (for example $NF_1$) may access the common SRB 1702, and rest all the different $NF_n$ modules may transmit and receive data through the $NF_1$ 402.

In FIG. 17B, consider the case when the PDCP entity is deployed on the different $NF_n$ modules. In this design, a common SRB may be configured with access to the single NF only. In this case, consider that UE 410 sends the message to the NF module. The message will be sent through the $NF_1$ (where the single common SRB 1702 is placed) to the DU module 406. Then, based on the message received at the DU module 406, the DU module 406 identifies that the message sent by the UE 410 is for which NF module.

After, associating the single common SRB with the single NF module, the handling of transmit operation between the UE 410 and the Network is explained in greater detail below with reference to FIG. 18.

Figure 18:
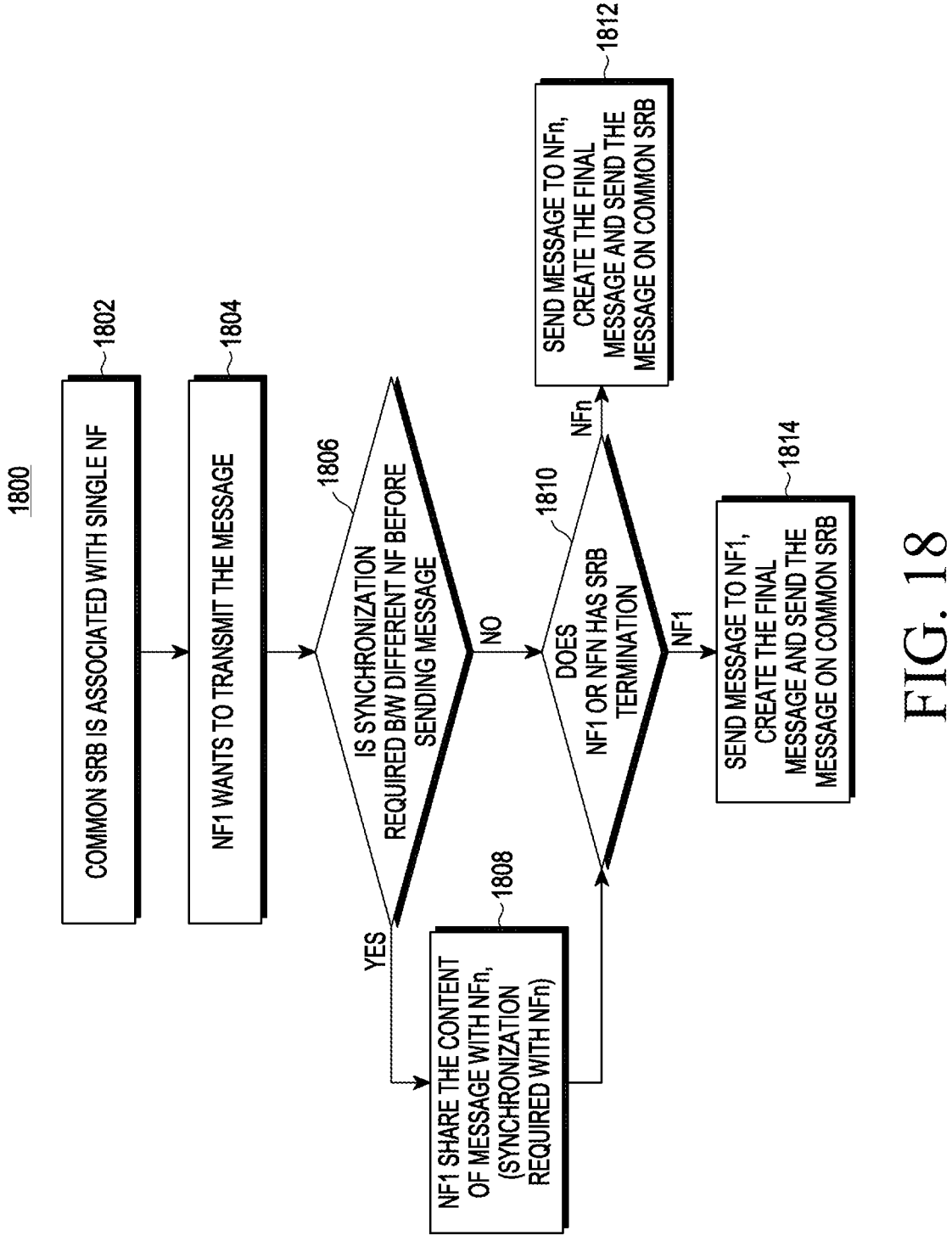
FIG. 18 is a flowchart illustrating example handling of transmit operation between a UE and a Network, according to various embodiments.

FIG. 18 is a flowchart 1800 illustrating example handling of transmit operation between UE and Network, according to various embodiments. Consider a case where the PDCP is deployed on the RAN module. Here in this case, the PDCP entity is deployed on the DU module 802. In an embodiment, the PDCP may be deployed on the HUB module 404, the switch, and the CMD. In FIG. 18, at 1802, the Network configures the single common SRB 1702 for the single NF module. Accordingly, the single NF module may transmit the message through this SRB 1702 only. In an embodiment, the network provides the same configuration at the UE and configures the common SRB for the transfer and reception of all the messages. Thereafter, at 1804, transmitting the message from the first NF module is performed. For example, consider, that the first NF module is $NF_1$ 402, which wants to transmit the message. This message may be the UE 410 associated message. Thereafter, at 1804, determining whether the synchronization is required between the different NF modules before sending the $NF_1$ message. There are a few messages that may require synchronization between the different $NF_n$ modules. The message is needed to be sent through a specific NF module only once synchronization is completed between different $NF_n$ modules. As an example, if a DRB configuration message is with the $NF_1$ module and the PHY and MAC configuration is with another NF say $NF_2$, coordination is required between these two NFs modules before sending the message to the UE. The $NF_1$ 402 module also sends the synchronization required to the $NF_2$ 502 through some content of the message or through a separate message.

Thereafter, at 1806, it is determined that the synchronization is not required between the different $NF_n$ modules, then move to 1810. At 1810, determining whether the first module e.g., the $NF_1$ 402 or the different $NF_n$ modules includes an SRB termination. If it is determined that the first NF module e.g., the $NF_1$ 402 includes the SRB termination, then the message may be sent to the $NF_1$ 402 at 1814. Thereafter, a final message may be created by the $NF_1$ 402 and sent on the single common SRB module at 1814.

In an example implementation, consider the case when the PDCP entity is deployed on the NF modules. In this design, consider the common SRB may be configured with access to the single $NF_1$ only, as shown in FIG. 17B. In this case, consider that UE 410 sends a message to the $NF_1$ 402 module. The message will be sent through the $NF_1$ (where the single common SRB is placed) to the DU module 406. Then, based on the message received at the DU module 406, the DU module 406 identifies that the message sent by the UE 410 is for which NF module.

Figure 19:
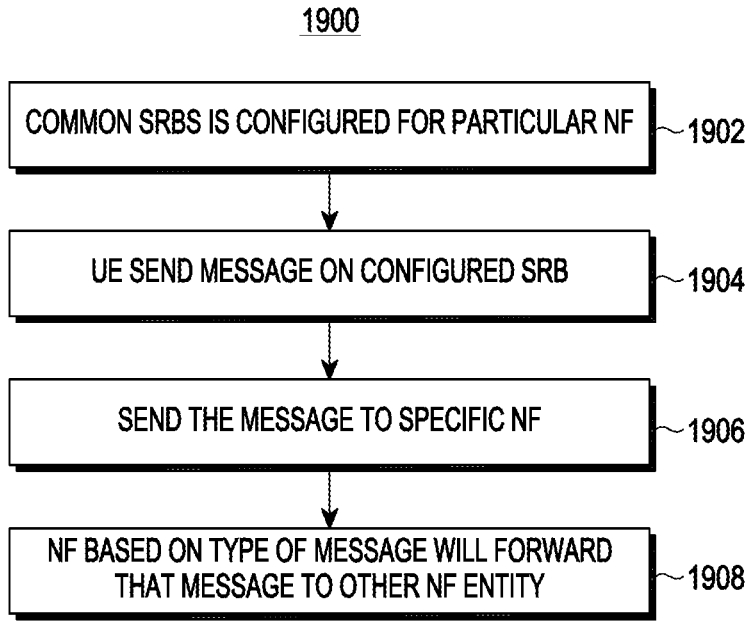
FIG. 19 is a flowchart illustrating example handling of receive operation between a UE and a Network, according to various embodiments.

FIG. 19 is a flowchart 1900 illustrating example handling of receive operation between UE and Network, according to various embodiments. Considering that the PDCP entity is deployed on the RAN module. After the deployment, at 1902, the single SRB is configured on at least one of the different NF modules. For example, consider that the single SRB is configured on the $NF_1$. Thereafter, at 1904, the UE 410 transmits the message to the single SRB. Thereafter, at 1906, the message from the single SRB is sent to a specific NF module. The specific NF module may be any NF module from the different $NF_n$ modules. Consider that the specific module may be any of the different NF modules among the different $NF_n$ modules. Thereafter, at 1908, the message from the specific module is sent to the other different modules except the specific module.

Figure 20A:
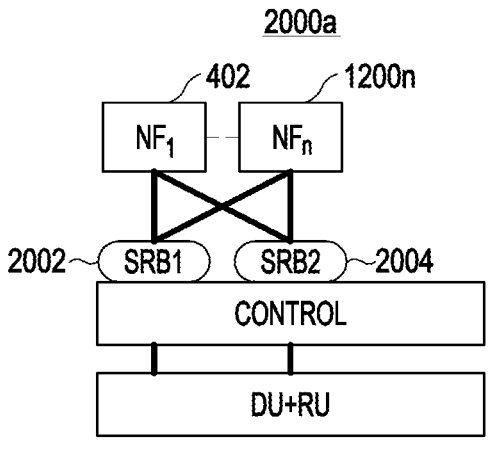
FIGS. 20A and 20B are diagrams illustrating example designs of multiple SRBs associated with each of different NFn modules, according to various embodiments.
Figure 20B:
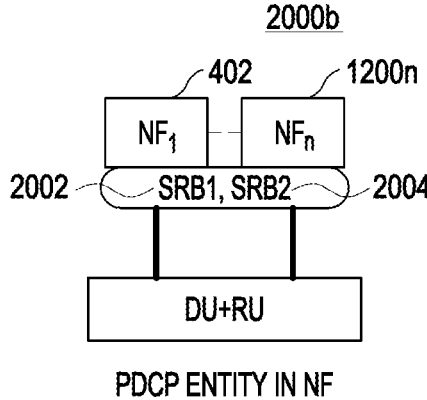

FIGS. 20A and 20B are diagrams 2000a and 2000b illustrating example designs of a multiple SRB associated with each of the different $NF_n$ modules, according to various embodiments. In FIG. 20A, consider a case when the PDCP entity is deployed on the RAN module. In this design, the multiple SRBs are configured for each of the NF modules e.g., each NF module has access to the multiple SRBs. Further, in this design, the message with priorities is sent over a high SRB or a low SRB. The message with the high priority may be sent to the high priority SRB and the message with the low priority may be sent to the low priority SRB. Further, in this design, identifiers are needed at the RAN module as multiple, or all the NFs modules are using same the SRB. The method defined above for the identification of the NF module is applicable in this case also.

In FIG. 20B, consider the case when the PDCP entity is deployed on the different $NF_n$ modules. In this design, each of the NF modules is configured with the multiple SRBs. The SRB may be the high priority SRB or may be the low priority SRB. The NF may generate high priority or low priority message and accordingly, it may be mapped to SRB which may carry high or low priority message.

Figure 21:
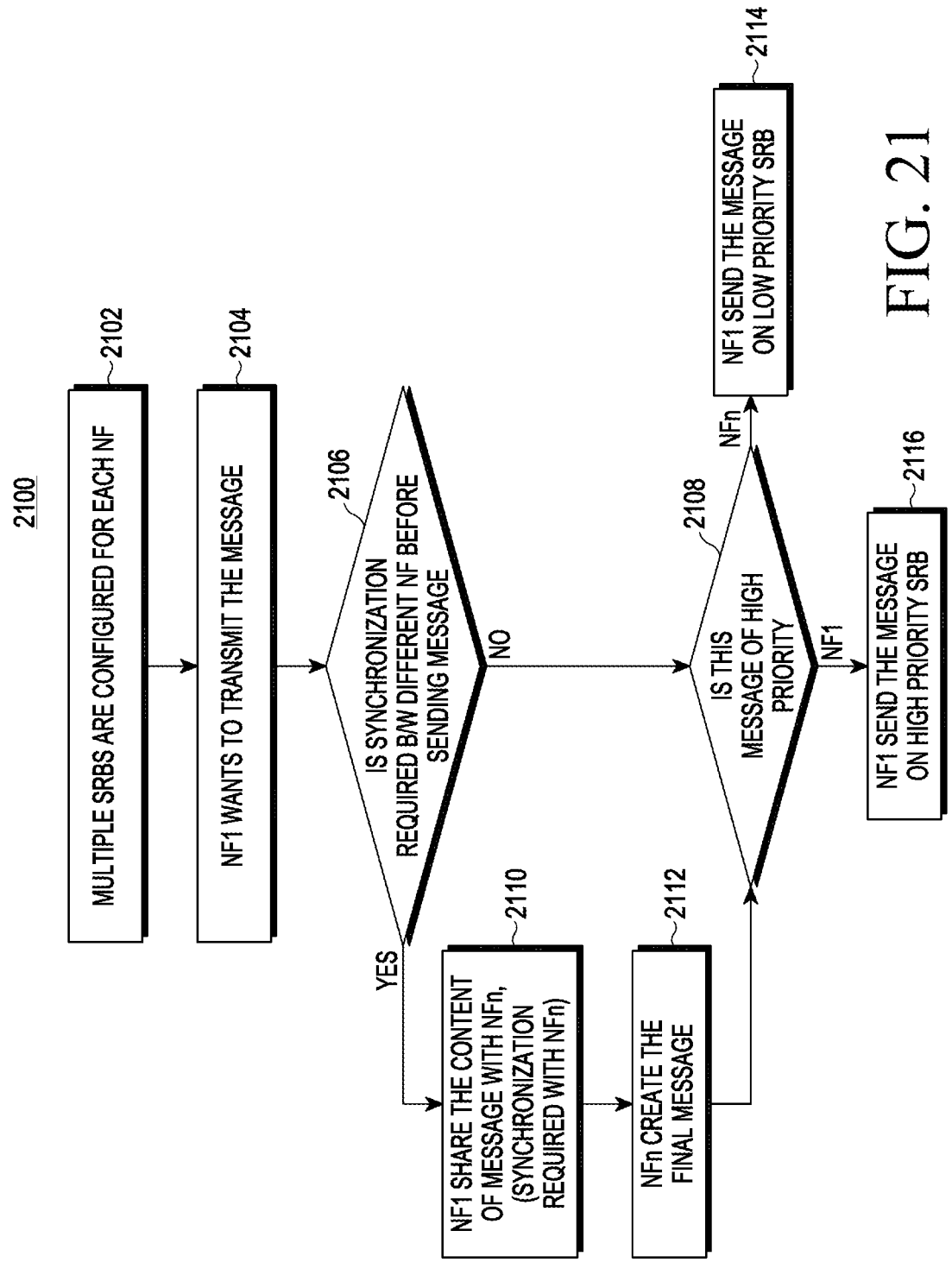
FIG. 21 is a flowchart illustrating example handling of transmit operation between a UE and a Network, according to various embodiments.

After, associating the multiple common SRBs with each of the different $NF_n$ modules, the handling of transmit operation between the UE 410 and the Network is explained with the help of FIG. 21 in the forthcoming paragraph.

FIG. 21 is a flowchart 2100 illustrating example handling of transmit operation between UE and Network, according to various embodiments. In FIG. 21, considering that the PDCP entity is deployed on the RAN module. After, the deployment of the PDCP entity, at 2102, each of the different $NF_n$ modules is configured with the multiple SRBs. The multiple SRB has different priorities. Thereafter, at 2104, consider that the first NF module wants to transmit the message. For example, say the first NF module is the $NF_1$ 402 module that wants to transmit the message. Thereafter, at 2106, it is determined whether the synchronization is required between the different $NF_n$ modules. If it is determined that the synchronization is not required between the different $NF_n$ modules, then move to 2108. At 2108, it is determined whether the $NF_1$ 402 message is of high priority. The determination that the $NF_1$ 402 message is of high priority depends on the determination that the synchronization is not required between the different $NF_n$ modules. So, if at 2108, it is determined that the $NF_1$ 402 message is not of high priority, then move to 2114. At 2114, the $NF_1$ 402 message is sent on the low priority SRB. Further referring back to step 2108, if it is determined that the $NF_1$ 402 message is of high priority, then move to 2116. At 2116, the $NF_1$ 402 message is sent on the high priority SRB.

Now, referring back to 2106, if it is determined that the synchronization is required between the different NF modules, then move to step 2110. At 2110, the message of the first NF module e.g., the $NF_1$ 402 module message is shared with any one of the NF modules that requires synchronization except the first NF module e.g., the $NF_1$ 402 module. Any one of the NF modules may be $NF_2$, $NF_3$ ... till $NF_n$. Thereafter, at 2112, a final message is created by any one of the NF modules that requires synchronization except the first NF module e.g., NF1 402. Thereafter at 2108, determining whether the final message is of the high priority. If it is determined that the final message is not of the high priority, then move to 2114. At 2114, the $NF_1$ 402 sends the final message on the low priority SRB. Further referring back to 1208, it is determined that the final message is of the high priority, then move to 2116. At 2116, the $NF_1$ 402 sends the final message on the high priority SRB.

In an example implementation, consider a scenario where the PDCP entity is deployed on the RAN module. After, the deployment of the PDCP entity, consider that the $NF_1$ 402, and $NF_n$ 1200$_n$ module is configured with the SRB1 2002 and SRB2 2004 as shown in FIGS. 20A and 20B. Assume that SRB1 2002 is of the high priority and the SRB2 2004 is of the low priority. Thereafter, taking an example that the $NF_1$ 402 module wants to transmit the message. Before transmitting the $NF_1$ 402 message, it is determined whether the synchronization is required between the $NF_2$ 502 module and $NF_3$ 504 module. If it is determined that the synchronization is not required between the $NF_2$ 502 module and $NF_3$ 504 module then, it is determined whether the $NF_1$ 402 message is of the high priority. In case the $NF_1$ 402 message is of the high priority, then the $NF_1$ 402 message is sent on the high priority SRB1 2002. In case it is determined that the $NF_1$ 402 message is not of the high priority, then the $NF_1$ 402 message is sent on the low priority SRB 2004.

In an example implementation, considering that the synchronization is required between the $NF_2$ 502 module and the $NF_3$ 504 module, then the message of the $NF_1$ 402 module is shared with either the $NF_2$ 502 module or the $NF_3$ 504 module. Sharing of the message with the $NF_2$ 502 module or the $NF_3$ 504 depends upon the synchronization. Consider that the message of the $NF_1$ 402 module is shared with the $NF_2$ 502 module based on the synchronization. Thereafter, the final message is created by the $NF_2$ 502 module. In case, the final message is of the high priority, then the $NF_1$ 402 sends the final message on the high priority SRB1 2002. In case the final message is not of the high priority, then the $NF_1$ 402 sends the final message on the low priority SRB 2004.

Figure 22:
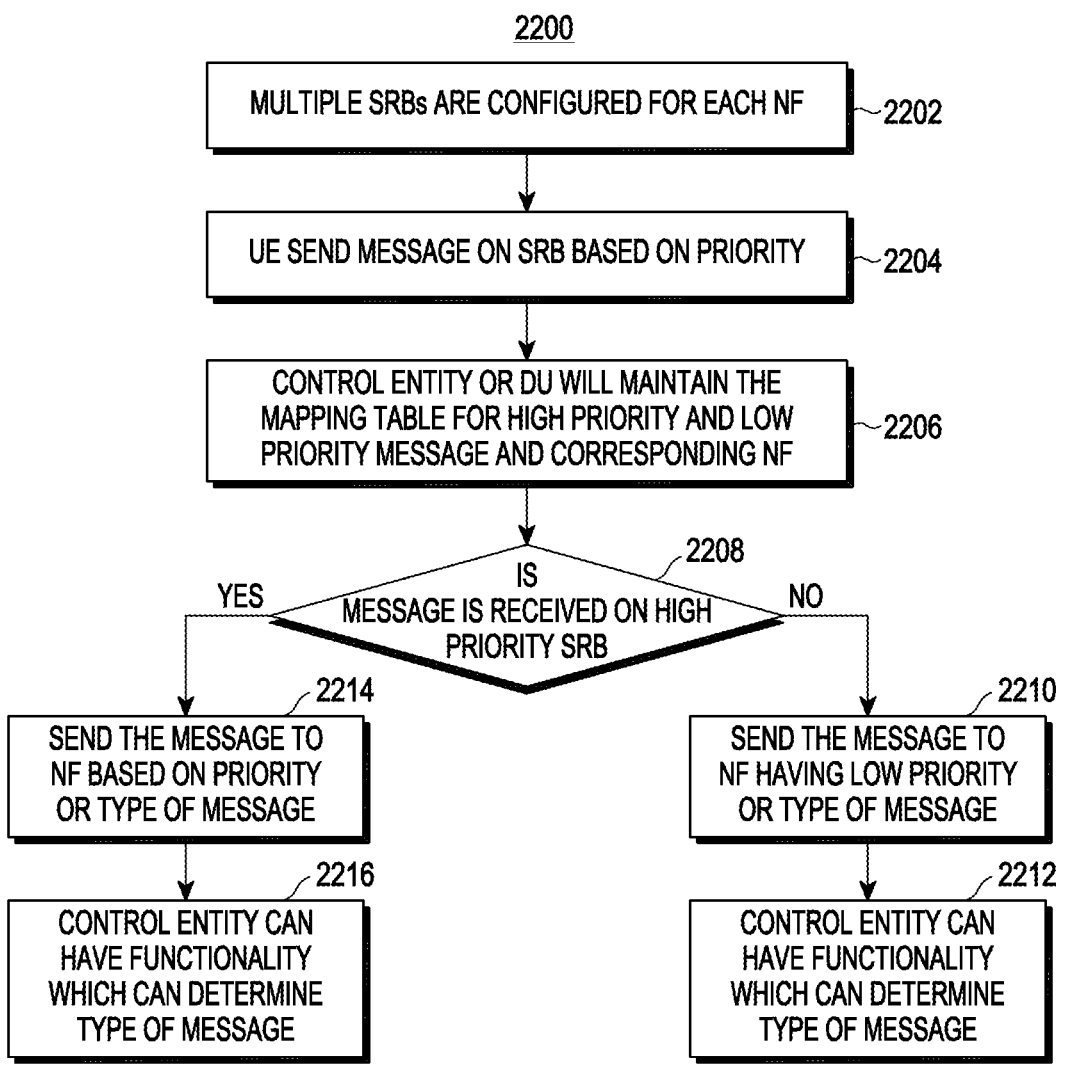
FIG. 22 is a flowchart illustrating example handling of receive operation between a UE and a Network, according to various embodiments.

FIG. 22 is a flowchart 2200 illustrating example handling of receive operation between the UE and the Network, according to various embodiments. Considering that the PDCP entity is deployed on the RAN module, and each of the different NF modules is configured with the multiple SRBs at 2202. Thereafter, at 2204, the UE sends the message on the multiple SRBs based on the priority. In an embodiment, the message may of the high priority or the low priority message. The multiple SRB has different priorities. For example, the different priority may be the high priority SRB or may be the low priority SRB. This priority may be decided based on the type of message or layer or the NF module. Thereafter, at 2206, the RAN module (DU) maintains a mapping table for the high priority and the low priority messages. Thereafter, at 2208, it is determined whether the message is received on the high priority SRB. If it is determined that the message is not received at the high priority SRB, then move to 2210. At 2210, the message is sent to the NF module having the low priority SRB or having the low priority message. At 2212, control entity may have functionality that may determine the type of the message.

Referring back to 2208, where it is determined that the message is received on the high priority SRB. Thereafter, at 2214, the message is sent to the NF module having the high priority SRB or having the high priority message. In an embodiment, the RAN module may have functionality that may determine the type of message at 2216.

Figure 23A:
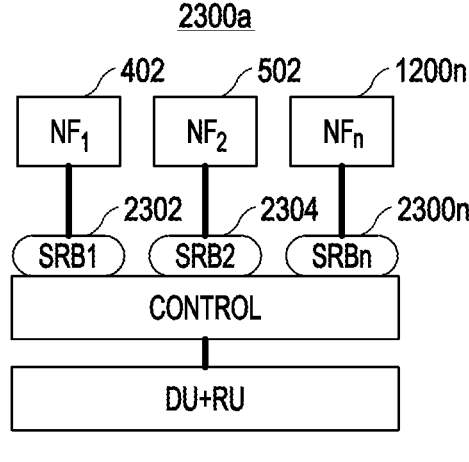
FIGS. 23A and 23B are diagrams illustrating example designs of a separate SRB associated with each of the different NFn modules, according to various embodiments.
Figure 23B:
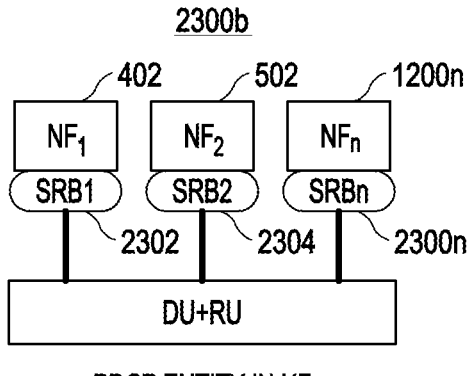

FIGS. 23A and 23B are diagrams 2300a and 2300b illustrating an example design of the separate SRB associated with each of the different $NF_n$ modules, according to various embodiments. In FIG. 23A, consider the case when the PDCP entity is deployed on the RAN module corresponding to the switch. In this design, the separate SRB may be configured with each of the different NF modules. Each of the separate SRBs has different priorities. The priority of these separate SRBs depends on the type of the message, or a UE layer. Each of the SRB is responsible for carrying the message from the specific NF only. Similarly, the UE 410 also sends the specific message over the specific SRB.

In FIG. 23B, consider the case when the PDCP entity is deployed on the different $NF_n$ modules. In this design, the separate SRB may be configured with each of the different $NF_n$ modules. Each of the separate SRBs has different priorities. The priority of these separate SRBs depends on the type of the message, or the UE layer.

Figure 24:
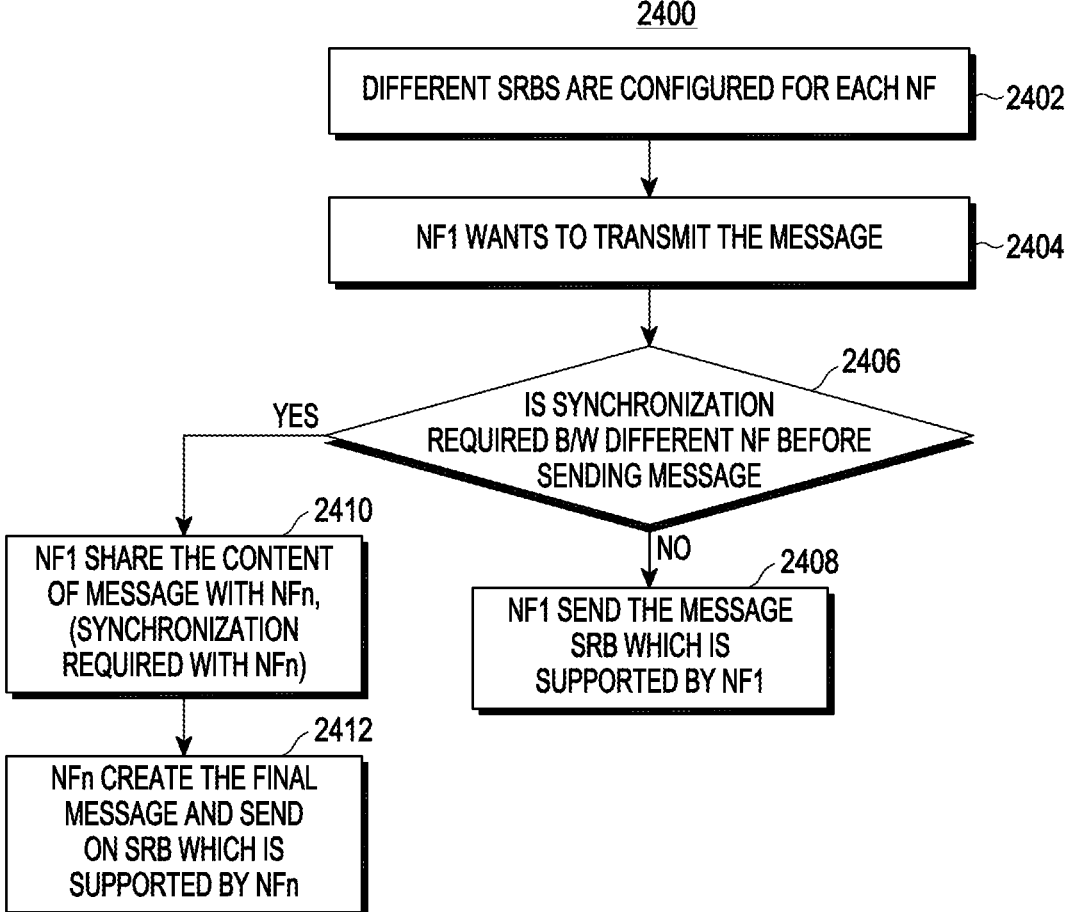
FIG. 24 is a flowchart illustrating example handling of transmit operation between a UE and a Network, according to various embodiments.

After, associating the separate SRB with each of the different $NF_n$ modules, the handling of transmit operation between the UE and the Network is explained with the help of FIG. 24 in the forthcoming paragraph.

FIG. 24 is a flowchart 2400 illustrating example handling of transmit operation between the UE and the Network, according to various embodiments. Consider a case where the PDCP entity is deployed on the RAN module corresponding to the switch. Here in FIG. 24, the PDCP entity is deployed on the DU module 802. In an embodiment, the PDCP may be deployed on the HUB module 404, the switch, and the CMD. In FIG. 18, at 2402, the network configures the separate SRB for each of the different NF modules. For example, the network may configure an SRB1 2302 for the $NF_1$ 402, an $SRB_2$ 2304 for the $NF_2$ 502, and an $SRB_n$ $2300_n$ for the $NF_n$ $1200_n$. Thereafter, at 2404, transmitting the message from the first NF module. Consider that the first NF module is $NF_1$ 402. Thereafter, at 2406, it is determined whether the synchronization is required between the different NF modules before sending the $NF_1$ 402 message. If it is determined that the synchronization is not required between the different $NF_n$ modules, then move to 2408. At 2408, the message of the first NF module e.g., the $NF_1$ 402 is sent to the SRB that is supported by the $NF_1$. For example, the message the $NF_1$ 402 module is sent to the SRB1 2302 that is supported by the $NF_1$ module 402.

Now, referring back to 2406, where if it is determined that the synchronization is required between the different $NF_n$ modules, then move to 2410. At 2410, the message of the first NF module e.g., the $NF_1$ 402 message is shared with the different $NF_n$ modules that require the synchronization except for the first module. So, suppose in this case synchronization is required between the $NF_2$ 502 and $NF_3$ 504. Then in that case the $NF_1$ module 402 message is shared with the $NF_2$ 502 and $NF_3$ 504. Thereafter, at 2412, a final message is created by the different $NF_n$ modules, and the final message is sent to the SRB that is supported by the different $NF_n$ modules.

Figure 25:
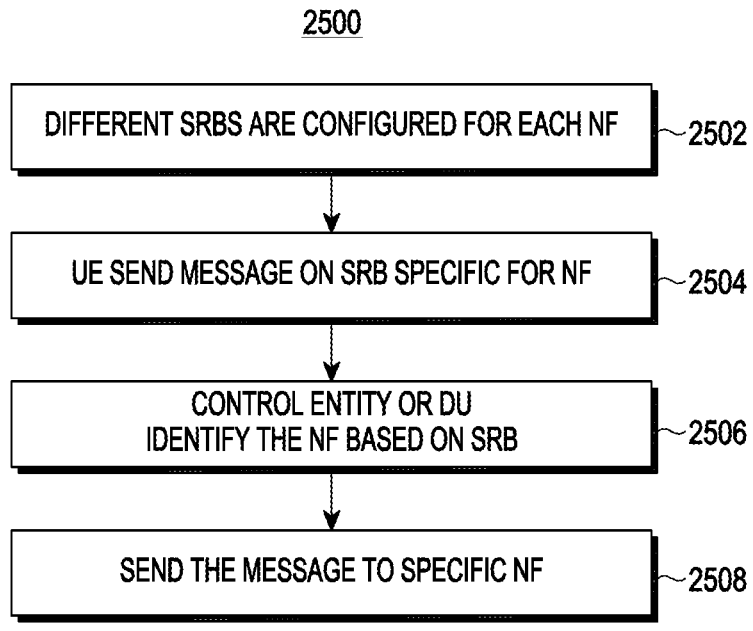
FIG. 25 is a flowchart illustrating example handling of receive operation between a UE and a Network, according to various embodiments.

FIG. 25 is a flowchart 2500 illustrating example handling of receive operation between the UE and the Network, according to various embodiments. Considering that the PDCP entity is deployed on the RAN module corresponding to the switch. After the deployment, at 2502, the separate SRB may be configured for each of the NF modules. Thereafter, at 2504, the UE 410 sends the message on the SRB which is specific for the NF module. Thereafter, at 2506, the RAN module (the DU module) identifies the specific NF module based on the SRB. Thereafter, at step 2508, the message is sent to the specific NF module.

Figure 27:
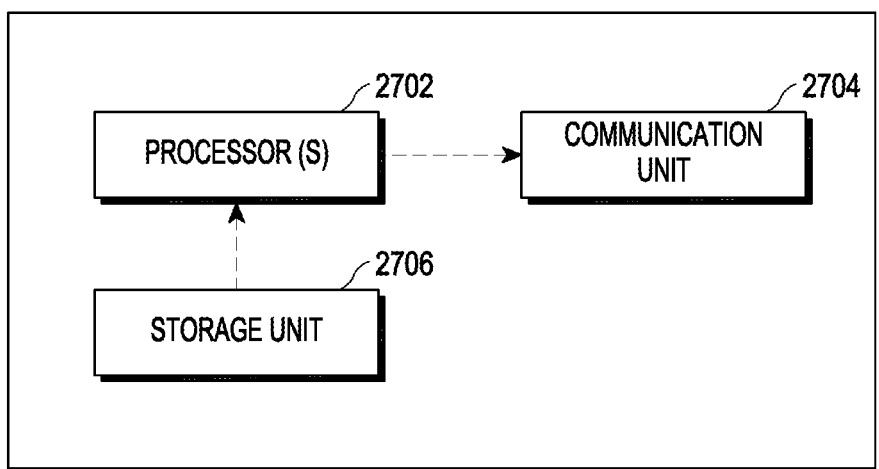
FIG. 27 is a block diagram illustrating an example configuration of a Network, according to various embodiments.

FIG. 27 is a block diagram illustrating an example configuration of a Network, according to various embodiments. The Network 2700 may correspond to 3GPP PLMN-A and/or N3GPP PLMN-A, as discussed throughout this disclosure. The Network 2700 may include at least one processor (e.g., including processing circuitry) 2702, a memory unit (e.g., a memory) 2706 (e.g., storage), and a communication unit (e.g., including communication circuitry) 2704 (e.g., communicator or communication interface). Further, the network 2700 may also include the cloud-RAN (C-RAN), a central unit (CU), a core network (NW), a distributed unit (DU), or any other possible network (NW) entity. The communication unit 2704 may include various communication circuitry and perform one or more functions for transmitting and receiving signals via a wireless channel.

As an example, the processor 2702 may include various processing circuitry and be a single processing unit or a number of units, all of which could include multiple computing units. The processor 2702 may be implemented as one or more microprocessors, microcomputers, microcontrollers, digital signal processors, central processing units, state machines, logic circuitries, and/or any devices that manipulate signals based on operational instructions. Among other capabilities, the processor 2702 is configured to fetch and execute computer-readable instructions and data stored in the memory. The processor 2702 may include one or a plurality of processors. At this time, one or a plurality of processors 2702 may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors 2702 may control the processing of the input data in accordance with a predefined operating rule or artificial intelligence (AI) model stored in the non-volatile memory and the volatile memory, e.g., memory unit 2706. The predefined operating rule or artificial intelligence model is provided through training or learning.

The memory 2706 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

Figure 28:
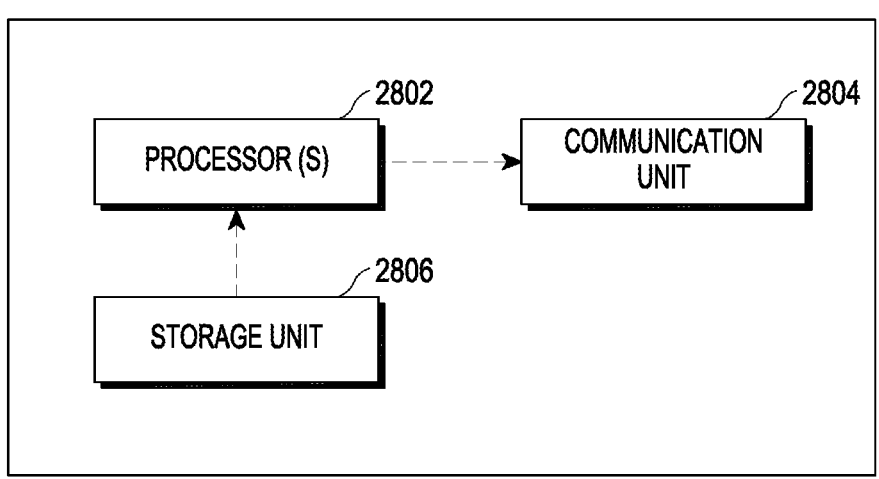
FIG. 28 is a block diagram illustrating an example configuration of user equipment (UE) in a wireless network, according to various embodiments.

FIG. 28 is a block diagram illustrating an example configuration of a user equipment (UE) in a wireless network, according to various embodiments. The configuration of FIG. 28 may be understood as a part of the configuration of the UE 2800. Hereinafter, it is understood that terms including "unit" or "module" at the end may refer to the unit (e.g., including various circuitry) for processing at least one function or operation and may be implemented in hardware, software, or a combination of hardware and software.

Referring to FIG. 28, the UE 2800 may include at least one processor (e.g., including processing circuitry) 2802, a communication unit (e.g., including communication circuitry) 2804 (e.g., communicator or communication interface), and a storage unit (e.g., including a memory) 2806 (e.g., storage). By way of example, the UE 2800 may be the user equipment 410, such as a cellular phone or other device that communicates over a plurality of cellular networks (such as a 3G, 4G, a 5G, or pre-5G, 6G network or any future wireless communication network). The communication unit 2804 may include various communication circuitry and perform functions for transmitting and receiving signals via a wireless channel.

As an example, the processor 2802 may include various processing circuitry and be a single processing unit or a number of units, all of which could include multiple computing units. The processor 2802 may be implemented as one or more microprocessors, microcomputers, microcontrollers, digital signal processors, central processing units, state machines, logic circuitries, and/or any devices that manipulate signals based on operational instructions. Among other capabilities, the processor 2802 is configured to fetch and execute computer-readable instructions and data stored in the memory. The processor 2802 may include one or a plurality of processors. At this time, one or a plurality of processors 2802 may be a general-purpose processor, such as a central processing unit (CPU), an application processor (AP), or the like, a graphics-only processing unit such as a graphics processing unit (GPU), a visual processing unit (VPU), and/or an artificial intelligence (AI)-dedicated processor such as a neural processing unit (NPU). The one or a plurality of processors 2802 may control the processing of the input data in accordance with a predefined operating rule or AI model stored in the non-volatile memory and the volatile memory, e.g., memory unit 2806. The predefined operating rule or artificial intelligence model is provided through training or learning.

The memory 2806 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

Referring now to various example advantages of the method and the system disclosed herein. The following technical advantages over the conventional and existing state of the art are provided by the method and system disclosed herein. The technical advantages include, for example, and without limitation:

6G network provides a degree of freedom for network function placement due to cloudification and virtualization of network functions.

Decrease of overall network Latency.

While the disclosure has been illustrated and described with reference to various example embodiments, it will be understood that the various example embodiments are intended to be illustrative, not limiting. It will be further understood by one skilled in the art, that various working modifications may be made to the method in order to implement the disclosure. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

What is claimed is:

1. A method for handling a control plane data transmission in a 6G network, the method comprising:

deploying, for handling control plane transmissions through a common signaling radio bearer (SRB), a packet data convergence protocol (PDCP) entity at one of: a plurality of radio access network (RAN) modules, a plurality of network function (NF) modules, or at least one NF module from the plurality of the NF modules;

based on the deployment of the PDCP entity, determining whether the PDCP entity interacts with each of the plurality of NF modules and with the RAN module;

based on a result of the determination, determining whether synchronization is required between the plurality of the NF modules; and based on a result of the determination of requirement of the synchronization, transmitting a message to the one of: the RAN modules, the plurality of NF modules, or the at least one of the NF module.

2. The method as claimed in claim 1, wherein each of the plurality of the NF modules is configured with a different logical channel (LC), wherein at least one of the RAN modules includes a hub module, a switch, and a distributed unit (DU).

3. The method as claimed in claim 1, wherein:

based on the deployment of the PDCP entity at the RAN modules, the determination that the PDCP entity interacts with each of the plurality of the NF modules, and the determination that the synchronization is not required between the plurality of the NF modules, the method further comprises:

transmitting the message of each of the plurality of the NF modules to a common SRB module.

4. The method as claimed in claim 1, wherein:

based on the deployment of the PDCP entity at the RAN modules, the determination that the PDCP entity interacts with each of the plurality of the NF modules, and the determination that the synchronization is required between the plurality of the NF modules, the method further comprises:

sharing the message of each of the plurality of the NF modules with one or more of the NF modules that requires synchronization;

generating a final message by the one or more of the NF modules that requires synchronization, based on the shared message; sending the final message of the one or more NF modules that requires synchronization to each of the plurality of the NF modules; and transmitting the final message by each of the plurality of the NF modules to a common SRB module.

5. The method as claimed in claim 1, wherein:

based on the deployment of the PDCP entity at the RAN modules, the determination that the PDCP entity inter- acts with a first NF module among the plurality of the NF modules, and the determination that the synchronization is not required between the plurality of the NF modules, the method further comprises:

transmitting the message of the first NF modules to a common SRB module, wherein NF modules, except the first NF module, interact with the first NF module, and wherein the NF modules, except the first NF module, transmit the message of the NF modules, except the first NF module, to the first NF module.

6. The method as claimed in claim 1, wherein: based on the deployment of the PDCP entity at the RAN modules, the determination that the PDCP entity inter- acts with a first NF module among the plurality of the NF modules, and the determination that the synchro- nization is required between the plurality of the NF modules, the method further comprises:

sharing the message of the first NF module with one or more of the NF modules that requires synchronization;

generating a final message by the one or more of the NF modules that requires synchronization, based on the shared message, and sending the final message of the one or more NF modules to the first NF module; and transmitting the final message by the first NF module to a common SRB module.

7. The method as claimed in claim 2, wherein:

based on the deployment of the PDCP entity on the at least one of the NF module, the determination that the PDCP entity interacts with the RAN module corresponding to the DU, the method further comprises: determining whether each NF module has the PDCP entity;

generating the message of each of the plurality of the NF module except a second NF module based on the determination that each of the NF module has not the PDCP entity, wherein the message is generated by each of the plurality of the NF module except the second NF module; and sending the generated message of each of the plurality of the NF module to the at least one NF module, wherein the at least one of the NF module interacts with the RAN module corresponding to the DU, wherein, based on the determination that each of the NF module has the PDCP entity, the method further com- prises:

determining that synchronization is required between the plurality of the NF modules;

sharing the message of each of the plurality of the NF modules with one or more of the NF modules that requires synchronization based on the determination that the synchronization is required between the plu- rality of the NF modules;

generating a final message by the one or more of the NF modules that requires synchronization, based on the shared message, and sending the final message to each of the NF module; and transmitting the final message by each of the NF module to a common SRB module, or determining the synchronization is not required between the plurality of the NF modules; and transmitting the message of each of the plurality of the NF modules to the common SRB module based on the determination that the synchronization is not required between the plurality of the NF modules.

8. The method as claimed in claim 1, wherein based on the deployment of the PDCP entity at the RAN module, the method further comprises:

configuring each of the NF module of the plurality of the NF modules with a common SRB module;

determining whether a first NF module from the plurality of the NF modules wants to transmit the message;

determining the synchronization is not required between the plurality of the NF modules;

transmitting the message of the first NF module to the common SRB module based on the determination that the synchronization is not required between the plural- ity of the NF modules;

mapping the message received on the common SRB module with respect to each of logical channel (LC) from a plurality of LC, wherein the message is trans- mitted through each of the LC to the RAN module;

determining that synchronization is required between the plurality of the NF modules;

sharing the message of the first NF module with any one of the NF module that requires synchronization except the first NF module;

creating a final message by any one of the NF module that requires synchronization except the first NF module; and transmitting the final message by any one of the NF module that require synchronization to the common SRB module.

9. The method as claimed in claim 1, wherein based on the deployment of the PDCP entity at the RAN module corre- sponding to a switch, the method further comprises:

configuring each of the plurality of the NF modules with a plurality of SRB, wherein each of the plurality of the SRB has different priorities;

determining whether a first NF module from the plurality of the NF modules wants to transmit the message;

determining the synchronization is not required between the plurality of the NF modules;

determining whether the message is of high priority based on the determination that the synchronization is not required between the plurality of the NF modules;

sending the message on a low priority SRB based on the determination that the message is of not a high priority;

sending the message on a high priority SRB based on the determination that the message is of the high priority;

determining that synchronization is required between the plurality of the NF modules;

sharing the message of the first NF module with any one of the NF modules that requires synchronization except the first NF module;

creating a final message by any one of the NF modules that requires synchronization except the first NF module;

determining whether the final message is of the high priority;

sending the final message on a low priority SRB based on the determination that the message is not of the high priority; and sending the final message on a high priority SRB based on the determination that the message is of the high priority.

10. The method as claimed in claim 1, wherein based on the deployment of the PDCP entity at the RAN module corresponding to a switch, the method further comprises:

configuring each of the NF module of the plurality of the NF modules with a plurality of common SRB;

determining whether a first NF module from the plurality of the NF modules wants to transmit the message;

determining the synchronization is not required between the plurality of the NF modules;

transmitting the message of the first NF module to a common SRB module based on the determination that the synchronization is not required between the plurality of the NF modules;

determining that synchronization is required between the plurality of the NF modules;

sharing the message of the first NF module with any one of the NF module that requires synchronization;

creating a final message by any one of the NF modules that requires synchronization; and sending the final message to the common SRB module based on the determination that the synchronization is required between the plurality of the NF modules.

11. The method as claimed in claim 1, wherein based on the deployment of the PDCP entity at the RAN module corresponding to a switch, the method further comprises:

configuring each of the NF modules of the plurality of the NF modules with a separate SRBs, wherein the separate SRBs are configured for each of the NF module;

transmitting the message from a first NF module from the plurality of the NF modules;

determining the synchronization is not required between the plurality of the NF modules;

sending the message to the separate SRB supported by the first NF module;

determining that the synchronization is required between the plurality of the NF modules;

sharing the message of the first NF module with any one of the NF modules that requires the synchronization except the first module;

creating a final message by the first NF module that requires the synchronization; and sending the final message to the SRB-supported by any one of the NF module that requires the synchronization except the first module.

12. The method as claimed in claim 1, wherein based on the deployment of the PDCP entity at the RAN module, the method further comprises:

configuring the at least one NF module from the plurality of the NF modules with a single SRB;

transmitting the message from a first NF module from the plurality of the NF modules;

determining the synchronization is not required between the plurality of the NF modules;

determining whether the first NF module or the plurality of the NF modules includes an SRB termination;

sending the message to the single SRB based on the determination that the first NF module or the plurality of the NF modules does not include the SRB termination, wherein the message is sent through at least one of the NF module from the plurality of the NF modules;

determining that the synchronization is required between the plurality of the NF modules;

determining the first NF module or the plurality of the NF modules includes the SRB termination;

sharing the message of the first NF module with any one of the NF modules that require the synchronization except the first module based on the determination that the first NF module includes the SRB termination;

creating a final message by the first NF module that requires the synchronization; and sending the final message to the single SRB.

13. The method as claimed in claim 1, wherein based on the deployment of the PDCP entity at the RAN module corresponding to a switch, the method further comprises:

configuring each of the plurality of the NF modules with a different SRB;

transmitting the message from a first NF module from the plurality of the NF modules;

determining the synchronization is not required between the plurality of the NF modules;

sending the message of the first NF module with the SRB that is supported by the NF module;

determining the synchronization is required between the plurality of the NF modules;

sharing the message of the first NF module with the plurality of the NF modules that requires the synchronization except the first module;

creating a final message by the plurality of the NF modules that requires the synchronization; and sending the final message to the SRB supported by the plurality of the NF modules.

14. The method as claimed in claim 1, wherein based on the deployment of the PDCP entity at the plurality of the NF modules, the method further comprises:

configuring each of the plurality of the NF modules with a different SRB;

transmitting the message from a first NF module from the plurality of the NF modules;

determining the synchronization is not required between the plurality of the NF modules; and sending the message of the first NF module with a SRB supported by the first NF module.

15. The method as claimed in claim 1, wherein:

based on the deployment of the PDCP entity at the RAN module, the method further comprises:

configuring each of the NF module of the plurality of the NF modules with a common SRB module;

mapping each of the NF modules with respect to a specific logical channel (LC) from a plurality of LC;

transmitting the message of a UE on the specific LC from the plurality of the LC;

identifying the NF module mapped with the specific LC from the plurality of the LC; and sending the message to the identified NF module.

16. The method as claimed in claim 1, wherein based on the deployment of the PDCP entity at the RAN module corresponding to a switch, the method further comprises:

configuring each of the NF modules of the plurality of the NF modules with a plurality of SRB, wherein each of the plurality of the SRB has a different priorities;

transmitting the message of a user equipment (UE) on the plurality of the SRB;

determining whether the message is received on a high priority SRB;

sending the message of a high priority to each of the NF module based on the determination that the message is received on the high priority SRB; and sending the message of a low priority to each of the NF module based on the determination that the message is received on a low priority SRB.

17. The method as claimed in claim 1, wherein based on the deployment of the PDCP entity is at the RAN module, the method further comprises:

configuring the at least one NF module from the plurality of the NF modules with a single SRB;

transmitting the message from a user equipment (UE) on the single SRB;

sending the message from the single SRB to a specific NF module from the plurality of the NF modules; and sending the message from the specific NF module to the plurality of the NF module except the specific NF module.

18. The method as claimed in claim 1, wherein based on the deployment of the PDCP entity at the RAN module, the method further comprises:

configuring each of the plurality of the NF modules with a plurality of SRB, wherein each of the plurality of the SRB has different priorities;

determining whether a user equipment (UE) wants to transmit the message on the plurality of the SRB, where the message is of a high priority message and a low priority message;

creating a table for a high priority message and low priority message by the RAN module;

determining whether the message is received on a high priority SRB;

sending the message to the NF module that has the high priority SRB based on the determination that the message is received on the high priority SRB; and sending the message to the NF module that has a low priority SRB based on the determination that the message is not received on the high priority SRB.

19. The method as claimed in claim 1, wherein based on the deployment of the PDCP entity at the plurality of the NF modules, the method further comprises:

configuring each of the plurality of the NF modules with a separate SRB;

transmitting the message on a SRB for a NF module from the plurality of the NF modules;

identifying the NF module from the plurality of the NF modules based on the SRB; and sending the message to the NF module based on the identification.

20. A network entity configured to handle a control plane data transmission in a 6G network, the network entity comprising:

memory storing instructions; and one or more processors, comprising processor circuitry, wherein the instructions, when executed by the one or more processors individually and/or collectively, cause the system to:

deploy, for handling control plane transmissions through a common signaling radio bearer (SRB), a packet data convergence protocol (PDCP) entity at one of: a plurality of radio access network (RAN) modules, a plurality of network function (NF) modules, or at least one NF module from the plurality of the NF modules;

based on the deployment of the PDCP entity, determine whether the PDCP entity interacts with each of the plurality of NF modules and with the RAN module;

based on a result of the determination, determine whether synchronization is required between the plurality of NF modules; and based on a result of the determination of requirement of the synchronization, transmit a message to one of: the RAN modules, the plurality of NF modules, or the at least one of the NF module.

* * * * *